(12) United States Patent
Saito et al.

(10) Patent No.: US 9,286,246 B2
(45) Date of Patent: Mar. 15, 2016

(54) SYSTEM FOR MANAGING TASK THAT IS FOR PROCESSING TO COMPUTER SYSTEM AND THAT IS BASED ON USER OPERATION AND METHOD FOR DISPLAYING INFORMATION RELATED TO TASK OF THAT TYPE

(75) Inventors: Takeshi Saito, Yokohama (JP); Tomoaki Kakeda, Yokohama (JP); Eitaro Ito, Kokubunji (JP); Daisuke Nogami, Musashino (JP); Junko Suzuki, Tama (JP)

(73) Assignee: HITACHI, LTD., Tokyo (JP)

( * ) Notice: Subject to any disclaimer, the term of this patent is extended or adjusted under 35 U.S.C. 154(b) by 60 days.

(21) Appl. No.: 13/060,387

(22) PCT Filed: Sep. 10, 2010

(86) PCT No.: PCT/JP2010/065653
§ 371 (c)(1),
(2), (4) Date: Feb. 23, 2011

(87) PCT Pub. No.: WO2012/032658
PCT Pub. Date: Mar. 15, 2012

(65) Prior Publication Data
US 2012/0066633 A1    Mar. 15, 2012

(51) Int. Cl.
*G06F 3/06* (2006.01)
*G06F 13/10* (2006.01)
(Continued)

(52) U.S. Cl.
CPC .............. *G06F 13/10* (2013.01); *G06F 3/0605* (2013.01); *G06F 3/067* (2013.01); *G06F 3/0631* (2013.01);
(Continued)

(58) Field of Classification Search
CPC ..... G06F 9/4446; G06F 3/0484; G06F 3/048; G06F 3/0481
USPC ............................ 715/707, 772; 345/204, 426
See application file for complete search history.

(56) References Cited

U.S. PATENT DOCUMENTS 5,317,688 A * 5/1994 Watson et al. ................. 715/707
6,177,944 B1 * 1/2001 Fowler et al. ................. 345/426
(Continued)

FOREIGN PATENT DOCUMENTS

CN          1567207 A       1/2005
JP          10-229508 A     8/1998
(Continued)

OTHER PUBLICATIONS

StatusNotifier—Oct. 2, 2008.*
(Continued)

*Primary Examiner* — Steven Sax
*Assistant Examiner* — David Choi
(74) *Attorney, Agent, or Firm* — Mattingly & Malur, P.C.

(57) ABSTRACT

The display computer displays a management screen having a first area and a second area. In the first area, information related to a computer system, and an input object for a work operation that is a user operation for registering a task of a processing to a computer system into a management computer or an object for displaying the input object are displayed. In the second area, a summary view related to at least one task registered into the management computer is displayed. The summary view has a status object for each status of task, the status object includes an object indicating a status and a value indicating a number of tasks of the status. When the management computer detects a modification of a status of each task that has been registered, the display computer updates a value of a number of tasks in the second area.

18 Claims, 15 Drawing Sheets

(51) Int. Cl.
*G06F 13/00* (2006.01)
*G06F 11/34* (2006.01)

(52) U.S. Cl.
CPC .............. *G06F 3/0653* (2013.01); *G06F 11/34* (2013.01); *G06F 13/00* (2013.01); *G06F 2206/1008* (2013.01)

(56) References Cited

U.S. PATENT DOCUMENTS

| | | | | |
|---|---|---|---|---|
| 6,246,397 | B1* | 6/2001 | Vossler | 345/204 |
| 6,480,901 | B1* | 11/2002 | Weber et al. | 709/246 |
| 7,573,808 | B2* | 8/2009 | Levesque et al. | 370/216 |
| 7,644,367 | B2* | 1/2010 | McKeon et al. | 715/762 |
| 7,827,476 | B1* | 11/2010 | Roberts et al. | 715/204 |
| 8,572,616 | B2* | 10/2013 | Cai et al. | 718/101 |
| 2002/0184360 | A1* | 12/2002 | Weber et al. | 709/223 |
| 2004/0061714 | A1 | 4/2004 | Sinclair et al. | 345/705 |
| 2005/0007959 | A1* | 1/2005 | Tomonaga et al. | 370/248 |
| 2005/0060663 | A1* | 3/2005 | Arkeketa et al. | 715/810 |
| 2005/0204306 | A1* | 9/2005 | Kawahara et al. | 715/782 |
| 2006/0028979 | A1* | 2/2006 | Levesque et al. | 370/229 |
| 2007/0168861 | A1* | 7/2007 | Bell et al. | 715/701 |
| 2007/0277174 | A1 | 11/2007 | Cai et al. | |
| 2008/0040030 | A1* | 2/2008 | Oohashi | 701/208 |
| 2008/0058773 | A1* | 3/2008 | John | 604/891.1 |
| 2008/0244437 | A1* | 10/2008 | Fischer | 715/772 |
| 2008/0282286 | A1* | 11/2008 | Or | 725/34 |
| 2009/0138884 | A1* | 5/2009 | Kakeda et al. | 718/104 |
| 2009/0149743 | A1* | 6/2009 | Barron et al. | 600/431 |
| 2009/0164933 | A1* | 6/2009 | Pederson et al. | 715/772 |
| 2009/0327890 | A1* | 12/2009 | Mertz et al. | 715/716 |
| 2010/0107161 | A1 | 4/2010 | Nishikawa | |
| 2010/0313156 | A1* | 12/2010 | Louch et al. | 715/769 |
| 2011/0302528 | A1* | 12/2011 | Starr | 715/800 |
| 2012/0066633 | A1* | 3/2012 | Saito et al. | 715/772 |

FOREIGN PATENT DOCUMENTS

| | | |
|---|---|---|
| JP | 2000-148632 A | 5/2000 |
| JP | 2004-341994 A | 12/2004 |
| JP | 2006-344089 A | 12/2006 |
| JP | 2008/139733 A1 | 11/2008 |
| JP | 2009-129134 A | 6/2009 |
| JP | 2010-108114 A | 5/2010 |
| JP | 2010-170161 A | 8/2010 |

OTHER PUBLICATIONS uTorrent Jul. 27, 2008.*
Windows Share Point Services Mar. 2007.*
International Search Report and Written Opinion of the International Searching Authority for PCT/JP2010/065653.
Chinese Office Action received in corresponding Chinese Application No. 201080067461.0 dated Feb. 6, 2015.

* cited by examiner

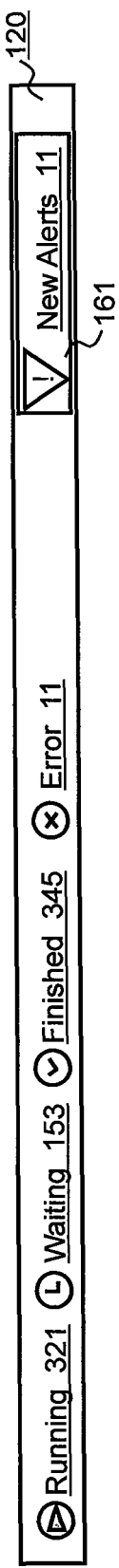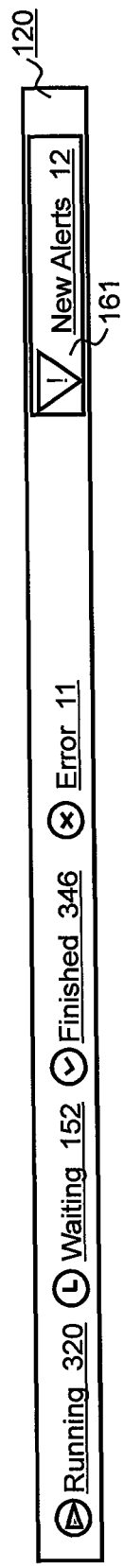
Fig. 4A
Fig. 4B

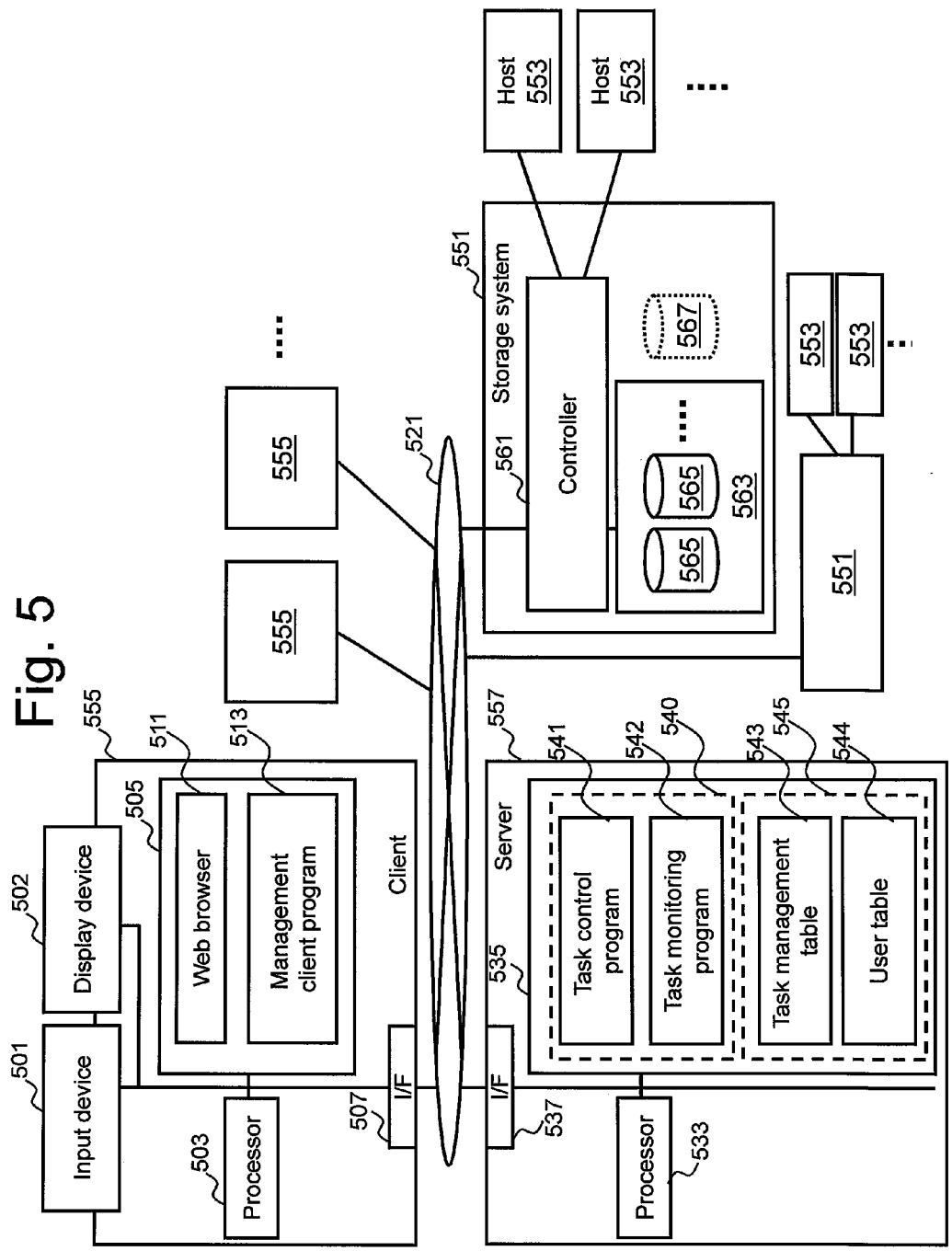

| Task ID 601 | Storage ID 602 | Task type 603 | User ID 604 | Status 605 | Update time 606 |
|---|---|---|---|---|---|
| 1 | ABC | Create TP Pool | User A | Waiting | 2010/07/22 11:00:00 |
| 2 | DEF | Create TP Pool | User B | Running | 2010/07/22 12:00:00 |
| 3 | DEF | Allocate Storage | User C | Finished | 2010/07/21 11:00:00 |
| 4 | ABC | Allocate Storage | User A | Finished | 2010/07/20 12:00:00 |
| ... | ... | ... | ... | ... | ... |

| User ID 611 | Number of Waiting statuses 612 | Number of Running statuses 613 | Number of Finished statuses 614 | Number of Error statuses 615 | Number of alerts 616 |
|---|---|---|---|---|---|
| User A | 2 | 1 | 1 | 1 | 1 |
| User B | 0 | 1 | 0 | 0 | 0 |
| User C | 0 | 0 | 1 | 1 | 1 |

SYSTEM FOR MANAGING TASK THAT IS FOR PROCESSING TO COMPUTER SYSTEM AND THAT IS BASED ON USER OPERATION AND METHOD FOR DISPLAYING INFORMATION RELATED TO TASK OF THAT TYPE

TECHNICAL FIELD

The present invention relates to a technique for managing a task.

BACKGROUND ART

As an example of a computer system that is a target of a management, there can be mentioned for instance a storage system that has a plurality of physical storage devices. Conventionally, a storage system has been managed by one computer. In recent years however, a storage system has been managed by a management system that is configured by a plurality of computers that include a management computer and a display computer that is coupled to the management computer (see Patent Literature 1). For the management system of this type, the display computer has a user interface device (for instance, a display and a keyboard), and the management computer transmits the information for a display to the display computer and/or receives the information for an input from the display computer.

The display computer executes a dedicated program for a display in a quintessential way. Or more specifically, the display computer downloads a Java applet via the Web browser and executes the Java applet.

CITATION LIST

Patent Literature

[PTL (Patent Literature) 1]
Japanese Patent Application Laid-Open Publication No. 2010-108114

SUMMARY OF INVENTION

Technical Problem

RIA (Rich Internet Application) has been in widespread use for a Web application field that targets a personal application and an office application (for instance, a Web mail, a word processor, and a collaboration tool). By accessing a Web server by using a Web browser, it looks like that a personal application or an office application is executed or provided on the Web browser for a user of the Web browser. Consequently in recent years, RIA (Rich Internet Application) can be executed by a great number of computers (such as a personal computer in which the Microsoft Windows OS or iMac has been installed) or a smartphone in some cases ("Windows" and "iMac" are registered trademarks).

An RIA can be executed in a quintessential manner under a program execution environment in which the Web browser includes or utilizes Flash of Adobe Corporation or the Silverlight technology of Microsoft Corporation. In recent years, an RIA development environment in which an icon and a toolbar that are visually beautiful for the RIA can be provided or displayed by the RIA without any difficulty has also been provided. Although only a processing that takes a user request as an opportunity can be installed for a Web page based on HTML and Java, a processing that is asynchronous with a user request can be executed under the execution environment and the development environment.

In accordance with such a merit, it is thought that a management client program of a computer system (such as a system that is configured by a plurality of servers, a storage system that has a plurality of physical storage devices, and a system that includes a storage system and a host that is coupled to the storage system) is made to be an RIA. However, the RIA execution environment and the RIA development environment target an application field such as a personal application and an office application, and it is not supposed that those are managed by monitoring and operating a computer system and a storage system in particular.

On the other hand, a user that utilizes a management client program executes a plurality of work operations in parallel to the management client program in some cases. The cases in which the following work operations are executed in parallel are examples:

Example 1 of a Work Operation

There is a work operation for a management work in which a setting or a configuration of a system is modified. For the example, a concrete example of a work operation is an instruction for executing a processing such as a network configuration for a computer that is a management target, an install of a program, and a processing of a volume creation and a volume initialization for a storage system.

Example 2 of a Work Operation

There is a work operation for a monitoring work in which a system is monitored. For the example, a concrete example of a work operation is an operation for specifying a specific apparatus or a device that is included in an apparatus in order to monitor a status of an apparatus in detail, an operation that has a purpose opposite to that of the operation (that is, an operation for transiting from a detailed screen to a panoramic screen), or an operation for confirming an alert in a past time from a status in which a current apparatus status is displayed. It is also possible to think of a status of a device as a substitute for a status of an apparatus for the present example.

However, for the RIA execution environment and the RIA development environment, it is not supposed that a user executes a plurality of work operations in parallel by using one application. Consequently, at the time point when the RIA displays a new window or a new dialogue box, a user cannot execute another work operation that a user wants to execute for the same Web browser (for the tab in a Web browser that has a tab function).

By the above reasons, it is not easy to make the management client program to be an RIA.

Solution of Problem

A management computer, that is a computer managing a computer system as a management target, is connected to a display computer that is a computer displaying information provided from the management computer.

The display computer displays a management screen that is a screen that has a first area and a second area. In that case, in the first area, information related to a computer system, and an input object for a work operation that is a user operation for registering a task of a processing for a computer system into a management computer or an object for displaying the input object are displayed. In the second area, a summary view related to at least one task registered into the management computer is displayed. The summary view is a view that has a status object for each status of task, the status object includes an object indicating a status and a value indicating a number of tasks in the status. There are a waiting status that represents that an execution of a task is waiting, a running status that represents that a task is being executed, and a finished status that represents that a task has been finished as a status of a task.

The display computer updates a display in the first area in accordance with a user operation to the first area.

The management computer detects a modification of a status of each task that has been registered. In the case in which the modification is detected, the management computer transmits a task number information that is information indicating a number of tasks in the status to the display computer. The display computer receives the task number information and updates a display in the second area in accordance with the task number information.

BRIEF DESCRIPTION OF DRAWINGS

FIG. 4A shows a second area 120 at a point of time. FIG. 4B shows an example of a highlighting for an alert object 161.

FIG. 5 shows the configuration of a computer system and a management system in accordance with an embodiment of the present invention.

FIG. 6A shows the configuration of a task management table 543. FIG. 6B shows the configuration of a user table 544.

DESCRIPTION OF EMBODIMENT

Figure 1:
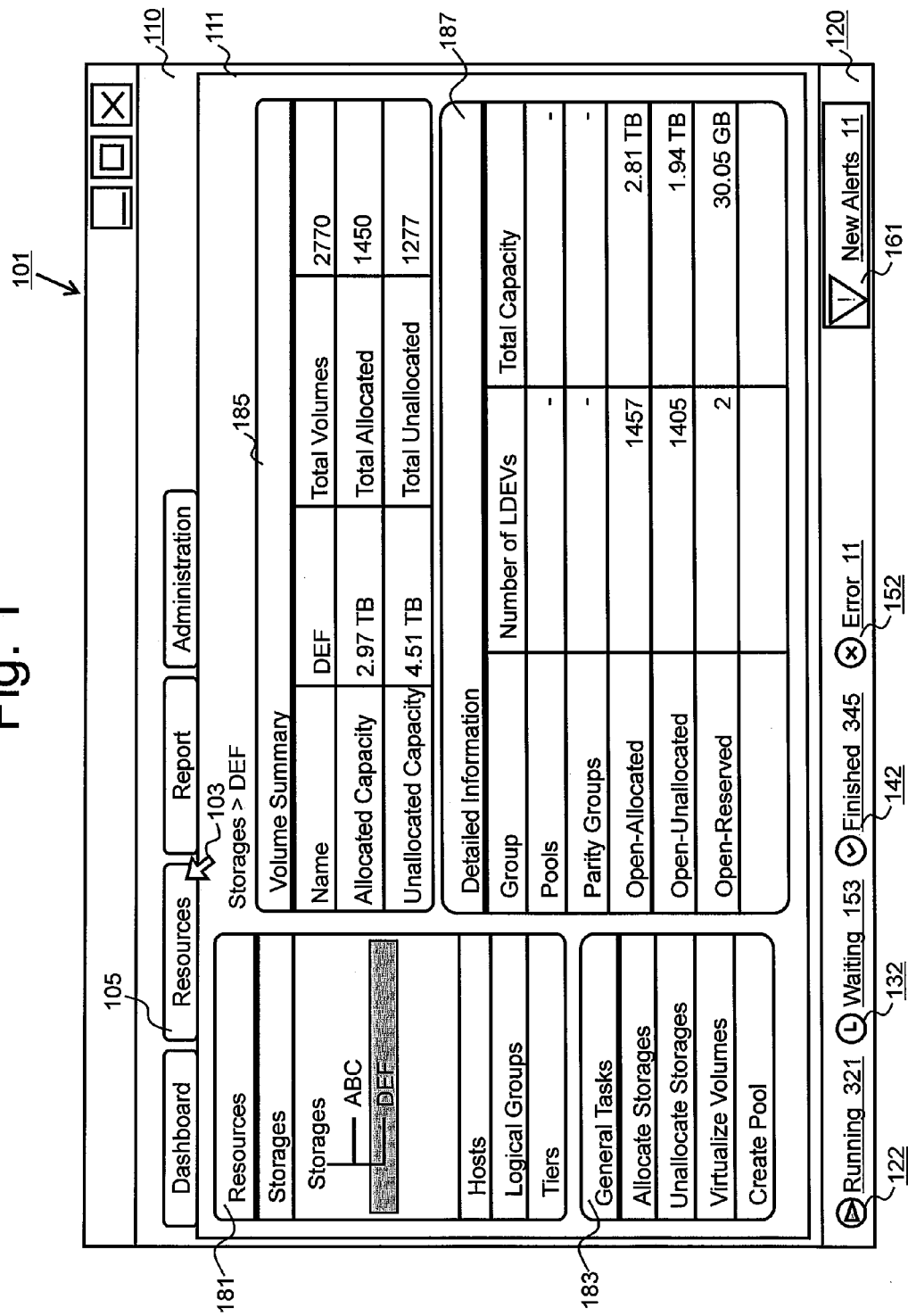
FIG. 1 shows an example of a Web browser screen in accordance with an embodiment of the present invention.

A mode for the present invention will be described below in detail with reference to the drawings.

In the following descriptions, a wide variety of information will be described by an expression of "xxx table" in some cases. However, a wide variety of information can also be represented by a data structure other than a table. In order to indicate that a data structure is not depended on, "xxx table" can also be referred to as "xxx information".

In the following descriptions, a processing will be described while using a "program" as a subject in some cases. However, since a program executes a predetermined processing while using a storage resource (such as a memory) and/or a communication interface device (such as a communication port) in an appropriate fashion in the case in which the program is executed by a processor (such as a CPU (Central Processing Unit)), a subject of a processing can also be a processor. A processing that is described while a program is used as a subject can also be a processing that is executed by a processor or a management system that has the processor (for instance, a display computer (such as a client) or a management computer (such as a server)). Moreover, the processor can also be a CPU itself, or can also include a hardware circuit that executes a part or a whole of a processing that is executed by the processor. A program can also be installed to each controller from a program source. A program source can also be a program distribution server or a storage medium, for instance. A program distribution server can also be a management computer.

A management system can also be configured by at least one computer. For instance to be more precise, in the case in which a management computer displays the information or a management computer transmits the information for a display to a remote computer, the management computer is a management system. For instance moreover, in the case in which a function equivalent to a management computer is implemented by using a plurality of computers, the plurality of computers is a management system (a display computer can also be included in the case in which a display is executed by a display computer). In the present embodiment, the management computer is a management system.

In the following descriptions, a number, an identifier, or a name is adopted as a type of the identification information of a target of every sort and kind (such as a task, a host, and a storage system). The number, the identifier, and the name can also be substituted with each other, and a combination of the identification information of a plurality of types can also be the identification information.

For an embodiment that will be described in the following, a computer system that is a management target is a storage system. However, a computer system is not restricted to a storage system. For instance, a computer system can also be a system that is configured by a plurality of servers and can also be a system that includes a storage system and a host computer (hereafter referred to as a host) that is coupled to the storage system.

In the following descriptions, a term of "time" is used. However, a time can also indicates the information of a year, a month, and a day, and a time can also indicates an hour, a minute, and a second (that includes fractions of a second after the decimal point) as a matter of course.

In the following descriptions, a user operation that is executed to a management screen of a computer system (a storage system in the present embodiment) can also be referred to as a "user operation". As a user operation, a "specification" of a tab or an object can be mentioned for instance.

The "specification" that is described here is an operation in which a cursor of a pointing device (such as a mouse) is put on a tab or an object and the pointing device is clicked or double-clicked after the cursor is put on the tab or the object, for instance. Such a specification is referred to as a "user specification" in the following. The user specification is one of user operations.

In the following descriptions, a user operation that is executed to browse (check, for instance) the information related to a computer system (a storage system in the present embodiment) can also be referred to as a "management operation".

In the following descriptions, a user operation that is executed to create a task for executing a processing that is executed by a computer system (a storage system in the present embodiment) (hereafter referred to as a storage operation task) can also be referred to as a "work operation". There is a wide variety of types of storage operation tasks (for instance, a step). For instance, as a storage operation task, there is at least one of a creation of a logical volume, an allocation of a logical volume to a host (a configuration of a logical volume and a host to which the logical volume is provided), and a creation of a pool. The "logical volume" can be a substantive logical volume (a real volume) based on at least one physical storage device (for instance, a RAID (Redundant Array of Independent (or Inexpensive) Disks) group) that is configured by a plurality of physical storage devices or a virtual logical volume (a virtual volume) that conforms to the thin provisioning or a storage virtualization technique. The "pool" can be a logical storage area based on at least one physical storage device (for instance, a RAID (Redundant Array of Independent (or Inexpensive) Disks) group) and an aggregate of at least one logical volume, for instance. The "pool" can be a pool that stores a difference between an original logical volume and a snapshot of the original logical volume or a pool that has a storage area that is allocated to a virtual volume that conforms to thin provisioning.

The task is a logical existence that is associated with a processing that is to be executed by a computer system (or a component of a computer system).

SUMMARY OF AN EMBODIMENT OF THE PRESENT INVENTION

FIG. 1 shows an example of a Web browser screen in accordance with an embodiment of the present invention.

A Web browser screen 101 is a screen that is displayed on a display device of a client computer (hereafter referred to as a client) that is an example of a display computer. The client is coupled to a server computer (hereafter referred to as a server) that is an example of a management computer that is coupled to a display computer.

The client executes a Web browser and a management client program that has been made to be an RIA as described later. Since the management client program is an RIA, the Web browser includes Flash of Adobe Corporation or the Silverlight technology of Microsoft Corporation in a quintessential manner (or is executed under the program execution environment that uses the technology). The information that is displayed on the Web browser screen 101 is the information that is provided from the management client program to the Web browser and that is displayed by the Web browser. The information that is provided from the management client program to the Web browser can includes the information that is received from a server by the management client program. In the case of a software architecture in which a part of a display control of the Web browser screen 101 is executed by the management client program, it is not necessary the case that the management client program provides the information to the Web browser. This is because the processing can be executed in such a manner that the management client program displays the necessary information on a part of the Web browser screen 101. This point is equivalent to that of an input processing. In the case in which the display information of the management client program can be displayed on the Web browser screen, other methods and other software architectures can also be adopted.

The Web browser screen 101 has a first area 110 and a second area 120.

The first area 110 is an area in which the information that indicates a status related to a storage system and/or an input object that can be operated by a user for a storage system are displayed. More specifically, a tab screen is displayed on the first area 110. A tab screen is changed corresponding to a tab in which a user specification has been executed. On any of the tab screens, the information that indicates a status related to a storage system and/or an input object that can be operated by a user for a storage system are displayed. A tab screen shown in FIG. 1 is a tab screen 111 that is displayed in the case in which a mouse cursor 103 is put on a tab "Resource" and a user specification is executed. The tab screen 111 displays the following subareas, for instance:

(*) a subarea 181 in which a list of the identification information of at least one resource that belongs to a resource type in which a user specification has been executed is displayed;

(*) a subarea 183 in which a list of types of work operations is displayed;

(*) a subarea 185 in which a summary of a resource in which a user specification has been executed in the subarea 181 is displayed; and (*) a subarea 187 in which a detail of a resource in which a user specification has been executed in the subarea 181 is displayed.

The information that conforms to a management operation of a user is displayed in the first area 110. More specifically, the information related to a storage system is displayed on a tab screen of a tab in which a user specification has been executed, for instance. The resource is a physical or logical component of a storage system or a host. As a resource, there can be mentioned for instance a physical storage device, a physical storage device group, a controller, and a volume.

The second area 120 displays a summary view related to at least one storage operation task that has been created by executing a work operation of a user. The summary view has status objects 122, 132, 142, and 152 for every status type related to a storage operation task and an alert object 161, for instance.

As a status related to a storage operation task, the following four types are mentioned, for instance:
  (A) "Running" that represents that a storage operation task is being executed;
  (B) "Waiting" that represents that an execution of a storage operation task is waited;
  (C) "Finished" that represents that a storage operation task has been finished; and
  (D) "Error" that represents that an error has occurred for a storage operation task.

The status type is not restricted to the above four types. For instance, the status types can also be more or less than the above four types. Moreover, at least one of the above four types can also be one of the other status types.

The status object 122 corresponds to the status of "Running", the status object 132 corresponds to the status of "Waiting", the status object 142 corresponds to the status of "Finished", and the status object 152 corresponds to the status of "Error".

Each of the status objects includes an object that indicates a status type and a value that indicates the number of storage operation tasks that belong to the status type. The object that indicates a status type can include at least one of a graphic (an icon) that indicates a status type and a character string that indicates a name of a status type, for instance. The object that indicates a status type can also include an object of a type different from a graphic and a character string.

The alert object 161 is an object related to an alert that is generated by detecting a failure of hardware in a storage system. The alert object 161 includes an object that indicates an alert and the value that indicates the number of alerts, for instance. The object that indicates an alert can include at least one of a graphic (an icon) that indicates an alert and a character string that indicates an alert (for instance, "New Alerts"). The object that indicates an alert can also include an object of a type different from a graphic and a character string.

Figure 2:
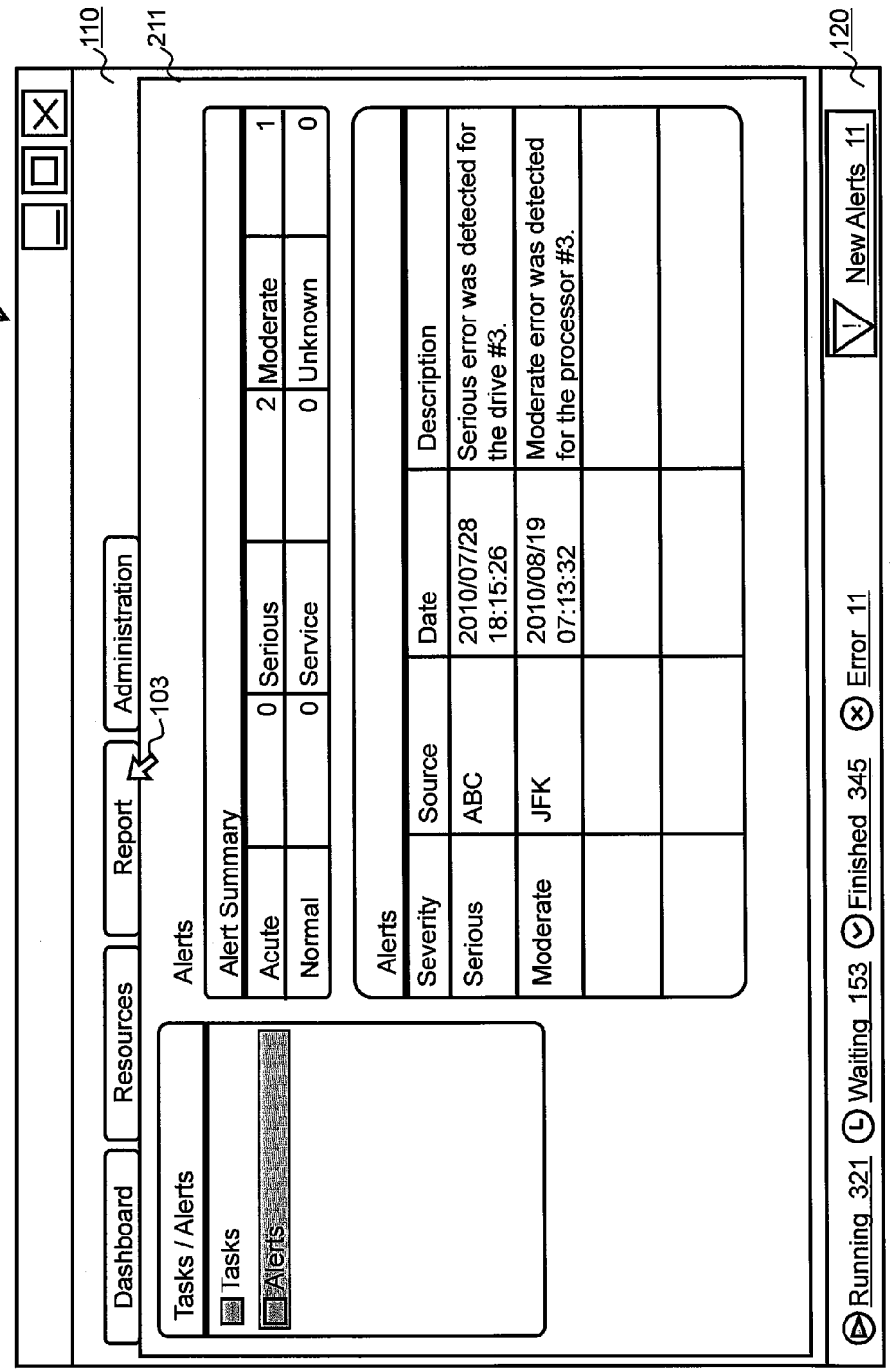
FIG. 2 shows an example of a Web browser screen after a switchover of a tab screen.

The second area 120 is displayed without being affected by a switch of a tab screen. In other words, although a tab screen is switched corresponding to a tab in which a user specification has been executed for the first area 110, a display of the second area 120 is not affected by a switch of a tab screen. More specifically, as shown in FIG. 2, for instance, in the case in which a user specification is executed for another tab "Report", although a tab screen is switched from a tab screen 111 shown in FIG. 1 to a tab screen 211 shown in FIG. 2 for the first area 110, a display of the second area 120 is not modified in synchronization with a switch of a tab screen. By the above configuration, even in the case in which a user operation is executed on a specific tab screen, a task status can be easily confirmed.

The meanings of "without being affected" and "not modified in synchronization with" are that at least the second area 120 is not affected or not modified for the purpose that "a summary view related to at least one storage operation task that has been created by executing a work operation of a user is displayed". For instance, even in the case in which a display of the second area 120 is switched corresponding to a switch of a tab screen, when a user who is in visual contact with the screen can recognize it as the same summary, it is apparent that an understanding of a summary by a user is not affected even in the case in which at least one of the following items and a display switch of the second area 120 occur corresponding to a switch of a tab screen:

(*) a display location of a status object or an alert object is modified;
(*) a font of a status object or an alert object is modified;
(*) an icon that indicates a type of status of a font of a status object is modified. An icon before a modification and an icon after a modification represent the same type of a status; and
(*) an icon that represents an alert of an alert object is modified. Both of an icon before a modification and an icon after a modification represent an alert.

As another example of being not affected or being not modified, there can be mentioned, for instance: (1) a type of a status that is represented by a status object that is displayed in the second area 120 is not changed by a switch of a tab screen, or (2) a value that indicates the number of storage operation tasks that belong to each of the status types is not changed. Moreover, as a second example, a display dot of the second area 120 is not changed by a switch of a tab screen. For the second example, a load of a screen display processing is smallest as compared with other examples. In addition, since a display dot of a screen display is not changed for the Flash technology and the Silverlight technology, it can make a contribution to a reduction of a communication amount between a client 555 and a server 557.

It is preferable that the second area 120 is displayed in such a manner that the second area 120 is not overlapped on the first area 110 (in particular a tab screen). In the present embodiment, the second area 120 is a band-like area that is long in a horizontal direction (in a transverse direction), and is disposed under the first area 110 (for instance, at the bottom of the Web browser screen 101). However, the location of the second area 120 is not restricted to the location shown in the figure. The second area 120 can also be disposed on the first area 110, for instance. Moreover, the second area 120 can also be a band-like area that is long in a vertical direction (in a longitudinal direction), and can be disposed at the right of or at the left of the first area 110. Moreover, the second area 120 can also be displayed on the front of the first area 110.

The management client program is an RIA. Consequently, a management client program receives the information from a server without issuing a request to the server. In other words, a server can provide the information to a client without a request from a client (or in non-synchronization with the operation timing of an input device) not as a response to a request from a client. There are some types of the information, and two examples of them will be described in the following.

Example 1

Figure 3A:
FIG. 3A shows a second area 120 at a point of time.
Figure 3B:
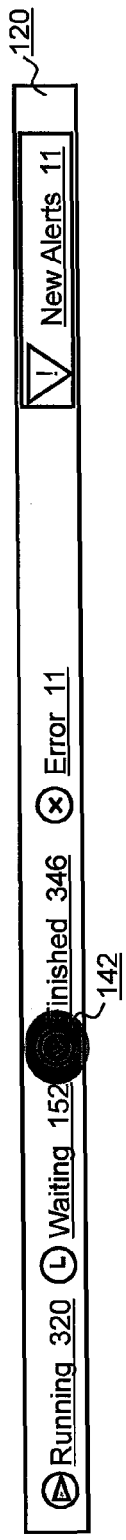
FIG. 3B shows an example of a highlighting that is executed in the case in which the number of storage operation tasks of the status "Finished" is increased.
Figure 3C:
FIG. 3C shows that the highlighting shown in FIG. 3B is canceled in the case in which a certain period of time elapses after the highlighting is started.

In the case in which a server detects that a status of a storage operation task is modified, the server transmits the information that indicates the modification of the storage operation task (hereafter referred to as the task status modification information) to a client. More specifically, a display of the second area 120 at a point of time is one shown in FIG. 3A, for instance. In the course of time, a storage operation task that has a status of "Running" (that is, a task that is being executed) is terminated. In the case in which a server detects that, the server transmits the task status modification information to a client. The task status modification information includes the information that indicates a reduction of the number of storage operation tasks that belong to a status in which the number of storage operation tasks is reduced ("Running") and the information that indicates an increase of the number of storage operation tasks that belong to a status in which the number of storage operation tasks is increased ("Finished"), for instance. The information that indicates a reduction can also be a value that indicates the number of storage operation tasks after the reduction and can also be the information that indicates a reduction by 1. Similarly, the information that indicates an increase can also be a value that indicates the number of storage operation tasks after the increase and can also be the information that indicates an increase by 1. In the case in which a client receives the task status modification information, the management client program modifies a display of the second area 120 in accordance with the task status modification information. More specifically, the management client program executes the following modification of a display as being found by comparing FIG. 3A and FIG. 3B:

(*) makes the number of storage operation tasks that belong to the status "Running" to be a value that is obtained by subtracting 1 from the number of storage operation tasks; and
(*) makes a display mode of an icon that corresponds to the status "Finished" to be another display mode for a certain period of time, and makes the number of storage operation tasks that belong to the status "Finished" to be a value that is obtained by adding 1 to the number of storage operation tasks. In the case in which another display mode of an icon is a display mode different from a normal display mode of an icon, any display mode can also be adopted. In the present embodiment, a display that conforms to another display mode of an icon is a display in which an icon is luminous in such a manner that a range that includes an icon and that is larger than an icon is luminous in a weak bright color as shown in FIG. 3B. The display is terminated after a certain period of time (for instance, several seconds) elapses. In other words, a display of the second area 120 transits from a display shown in FIG. 3B to a display shown in FIG. 3C after a certain period of time. For this example, although some modification examples (for instance, the following modification example) are thought of, it is thought to be preferable that a display mode is modified only for a status object of a status in which the number of storage operation tasks is increased (that is, a status to which a storage operation task is transited is notified) and a status object of a status in which the number of storage operation tasks is reduced from the point of view of understanding an execution situation of a storage operation task by a user.

(*) a display mode of a whole or a part (for instance, a text) of a status object that corresponds to a status in which the number of storage operation tasks has been increased (here a status object 142) is modified; and (*) a display mode of a whole or a part (for instance, an icon and/or a text) of a status object that corresponds to a status in which the number of storage operation tasks has been increased (here a status object 122) is modified as substitute for or in addition to a status in which the number of storage operation tasks has been increased.

Example 2

In the case in which a server detects some kind or another of hardware failure related to a storage system (for instance, a failure of a controller or a failure of a physical storage device), the server transmits the information that indicates the modification related to a hardware failure (hereafter referred to as the alert information) to a client. The alert information can include the information that indicates that a hardware failure has occurred and the detailed information related to a hardware failure that has been detected (for instance, the identification information (such as a name) of a device in which a failure has occurred and a location in which the device is mounted), for instance. In the case in which a client receives the alert information, the management client program modifies a display mode of an alert object 161 of the second area 120. More specifically, the management client program adds 1 to a value that indicates the number of alerts and modifies a display mode of a whole of the alert object 161 from a normal display mode as being found by a comparison of FIG. 4A and FIG. 4B, for instance. Further more specifically, the management client program makes a whole of the alert object 161 to be a red display and makes the red display blink on and off. Not only a whole but also a part (for instance, an icon or a text) of a display mode of an alert object 161 can also be modified. A modification of a display mode of an alert object 161 is not restricted to blinking, and it can also be another modification such as lighting.

The above described is an example of the information that is transmitted from a server to a client in a positive manner.

In accordance with the above example 1, some kind or another highlighting is executed for a certain period of time as a modification of a display mode of a status object, and the highlighting is then terminated in an automatic manner (that is, without a specific user operation). A "specific user operation" described here can be a user operation for notifying the management client program that a user has found some kind or another highlighting related to a status object.

On the other hand, in accordance with the above example 2, some kind or another highlighting (for instance, a blinking of a display of a predetermined color) is continued until the specific user operation is executed as a modification of a display mode of an alert object 161. A "specific user operation" described here can be a user operation (for instance, a click of an alert object 161) for notifying the management client program that a user has found some kind or another highlighting related to the alert object 161.

As described above, for a highlighting of a status object, a highlighting is terminated in the case in which a certain period of time elapses without a specific user operation. However, for a highlighting of an alert object 161, a highlighting is continued in the case in which a specific user operation is not executed. Any highlighting brings about an attention of a user. A highlighting of a status object is terminated in an automatic manner in the case in which a certain period of time elapses. Consequently, the strength of bringing about an attention of a user for a highlighting of a status object is smaller than the strength of bringing about an attention of a user for a highlighting of an alert object 161.

In the following descriptions, a highlighting of a status object (a highlighting that is terminated without a specific user operation in the case in which a certain period of time elapses) will be referred to as a "weak arousal display", and a highlighting of an alert object 161 (a highlighting that is terminated by a specific user operation) will be referred to as a "strong arousal display".

It is thought that a detection of a modification of a status of a storage operation task has an importance lower than that of a detection of a hardware failure. Consequently, in the case in which a highlighting of a status object and a highlighting of an alert object 161 are displays that have the equivalent strength, all of the second area 120 may be hard to be visible. Therefore, it is preferable that a strong arousal display is executed for an alert object 161 and a weak arousal display (a highlighting that is terminated in an automatic manner in the case in which a certain period of time elapses) is executed for a status object.

Moreover, a modification of a status of a storage operation task is executed from one moment to the next as there is a larger amount of storage operation tasks that is waiting an execution and/or storage operation tasks that is being executed. However, in the case in which a highlighting of a status object is continued until a specific user operation is executed, a highlighting of all status objects is executed in the course of time. In that case, a situation of an execution of a storage operation task is hard to be known. From such a point of view, for a modification of a status of a storage operation task, it is preferable that a weak arousal display is executed for a status object.

A mode for the present invention will be described below in detail.

<Details of an embodiment of the present invention>

FIG. 5 shows the configuration of a computer system and a management system in accordance with an embodiment of the present invention.

A computer system includes at least one host 553 and at least one storage system 551 that is coupled to the at least one host 553. The host 553 is coupled to the storage system 551 via a communication network (such as a SAN (Storage Area Network) or a LAN (Local Area Network)), for instance.

The storage system 551 has a physical storage device group 563 and a controller 561 that is coupled to the physical storage device group 563.

The physical storage device group 563 has at least one RAID (Redundant Array of Independent (or Inexpensive) Disks) group (referred to as a parity group in some cases). The RAID group is configured by a plurality of physical storage devices and stores data in accordance with a predetermined RAID level. The physical storage device is an HDD (Hard Disk Drive) or an SSD (Solid State Drive), for instance.

The storage system 551 has a plurality of logical volumes. As a logical volume, there can be mentioned for instance a substantive logical volume (a real volume) 565 based on the RAID (Redundant Array of Independent (or Inexpensive) Disks) group or a virtual logical volume (a virtual volume) 567 that conforms to the thin provisioning or a storage virtualization technique. It is not necessary that one storage system 551 has logical volumes of a plurality of types. For instance, the storage system 551 can have only a real volume 565 as a logical volume.

The controller 561 receives an I/O (Input/Output) command (a write command or a read command) from the host 553, and controls the I/O of data that conforms to the I/O command. More specifically, the controller 561 specifies a logical volume of an I/O destination from the I/O command that has been received, and executes the I/O of data to the logical volume that has been specified, for instance.

The management system includes a server 557 and at least one client 555 that is coupled to the server 557. The client 555 is coupled to the server 557 via a communication network (such as a LAN, a WAN (Wide Area Network), and the Internet) 521, for instance.

The client 555 has an input device 501, a display device 502, a storage resource (such as a memory) 505, a communication interface device (hereafter referred to as an I/F) 507, and a processor (such as a CPU (Central Processing Unit)) 503 that is coupled to the input device 501, the display device 502, the storage resource 505, and the communication interface device 507. The input device 501 is a pointing device and a keyboard, for instance. The display device 502 is a device that has a display screen on which information is displayed, for instance. A device of a touch panel type in which the input device 501 and the display device 502 are formed in an integrated manner with each other can also be adopted. The I/F 507 is coupled to the communication network 521, and the client 555 can communicate with the server 557 via the I/F 507. A part or a whole of a network that connects the communication network 521 and the host 553 with each other and apart or a whole of a network that connects the communication network 521 and the storage system 551 with each other can share each other in common.

The storage resource 505 has at least a main storage device (a memory in a quintessential manner) of a main storage device and an auxiliary storage device, for instance. The storage resource 505 can store a computer program that is executed by the processor 503 and the information that is used by the processor 503. More specifically, the storage resource 505 stores a Web browser 511 and a management client program 513, for instance. The management client program 513 is an RIA (Rich Internet Application). More specifically, the management client program 513, which is a program file, is downloaded from the server 557 (or another computer) and is stored into the storage resource 505, for instance. The management client program 513 is executed by a computer program not shown (such as the Flash Player of Adobe Corporation) in an RIA execution environment. Consequently in the present embodiment, an operation of the management client program 513 is an operation that conforms to the RIA execution environment (a computer program that executes the management client program). In the case in which a function set that is not installed in the RIA execution environment that is executed by a client (for instance, a communication processing, an I/O processing, and a processing call of a subroutine and an event handler, etc.) is provided in a development environment that is not the RIA, it can be said that the function set cannot be used by the management client program 513.

The server 557 has a storage resource 535, an I/F 537, and a processor (such as a CPU (Central Processing Unit)) 533 that is coupled to the storage resource 535 and the I/F 537. The I/F 537 is coupled to the communication network 521, and the server 557 can communicate with a client 555 via the I/F 537.

The storage resource 535 has at least a main storage device (a memory in a quintessential manner) and an auxiliary storage device, for instance. The storage resource 535 can store a computer program that is executed by the processor 533 and the information that is used by the processor 533. More specifically, the storage resource 535 stores a storage management program 540 and storage management information 545, for instance. The storage management program 540 has a task control program 541 and a task monitoring program 542. The storage management information 545 has a task management table 543 and a user table 544. The task control program 541 registers and executes a storage operation task. The task monitoring program 542 monitors a change of a status of a storage operation task. The task management table 543 has the information related to a storage operation task. The user table 544 has the information related to a wide variety of statuses for every user. In addition, the storage management information 545 can also have the configuration information and the setting information of the storage system 551 (for instance, at least one of contents that is displayed on the screen of FIG. 1). Although it is assumed that at least a part of the contents of the storage management information is received from the storage system 551, a part of the contents of the storage management information can also be received by other methods (such as a manual input and acquiring via another computer or a storage medium). Although the storage management information 545 also includes the information related to a hardware failure as a matter of course, the information related to a hardware failure can also exist as a part of the configuration information or can also exist as a failure history.

The storage management processing that corresponds to a user operation can be implemented by a cooperative processing of the storage management program 540, the Web browser 511 (or the RIA execution environment of a client), and the management client program 513. As examples of the cooperative processing, there can be mentioned for instance the following processings:

Cooperative Example 1

The Web browser 511 (or the management client program 513) stores a part of the storage management information 545 that is necessary for a user operation that is executed on a screen that is being displayed and the display information that has been calculated based on the storage management information 545 as the temporary information into the storage resource 505. The display information indicates not only the information that is displayed but also the control information that is used for a display processing. A part of the storage management information 545 is transmitted by the storage management program 540. Moreover, apart of the display information can also be calculated and transmitted by the storage management program 540. The management client program 513 then implements a storage management processing by using the temporary information to a part of a user operation.

Cooperative Example 2

The storage management program 540 creates and transmits a display image. The Web browser 511 (or the management client program 513) receives the display image and executes an actual screen display. The Web browser 511 (or the management client program 513) receives an input of a user (a keyboard input and a click location), and transmits the input of a user to the storage management program 540.

It is not necessary that the management client program 513 communicates with the storage management program 540 on a consistent basis in some cases (in the case in which the management client program 513 can correspond to a user operation by temporary information, for instance). In this case, the client 555 as a simple element can provide a monitoring work or a management work to a user. The following descriptions will be carried out while assuming Cooperative example 1. However, the following descriptions can also be understood as descriptions of Cooperative example 2 by considering that a part of the management client program 513 is executed by the storage management program 540 as a matter of course.

FIG. 6A shows the configuration of a task management table 543.

The task management table 543 has the following information for every storage operation task, for instance:
(*) a task ID 601 that is an identifier of a storage operation task;
(*) a storage ID 602 that is an identifier of a storage system 551 that is an operation target that conforms to a storage operation task;
(*) a task type 603 that is the information that indicates a type of a storage operation task;
(*) a user ID 604 that is an identifier of a user who has executed a work operation for creating a storage operation task;
(*) a status 605 that is a value that indicates a status of a storage operation task; and
(*) an update time 606 that is information that indicates the latest time when a status of a storage operation task was updated.

As described above, the task management table 543 has information related to all storage operation tasks that have been created by all work operations of a user of at least one client 555.

As a type of a storage operation task, there can be mentioned for instance a wide variety of types such as the following types:
(*) creating a logical volume (for instance, a real volume or a virtual volume) in the storage system 551;
(*) allocating a logical volume that has been created in the storage system 551 to a host 553 (determining and specifying a host 553 and a logical volume that is provided to the host 553);
(*) associating a pool (a storage area that has been configured by a substorage area of a "page" that is a unit of an allocation) with a virtual volume that conforms to thin provisioning; and
(*) associating a real volume in a storage system other than a storage system that has the virtual volume with a virtual volume that conforms to a storage virtualization technique.

FIG. 6B shows the configuration of a user table 544.

The user table 544 has the following information for every user, for instance:
(*) a user ID 611 that is an identifier of a user;
(*) the number of Waiting statuses 612 that is a value that indicates the number of storage operation tasks that has a status of "Waiting";
(*) the number of Running statuses 613 that is a value that indicates the number of storage operation tasks that has a status of "Running";
(*) the number of Finished statuses 614 that is a value that indicates the number of storage operation tasks that has a status of "Finished";
(*) the number of Error statuses 615 that is a value that indicates the number of storage operation tasks that has a status of "Error"; and
(*) the number of alerts 616 that is a value that indicates the number of alerts (for instance, unresolved alerts).

As described above, the user table 544 has information that indicates a status of a storage operation task that exists, the number of the storage operation tasks, and the number of alerts for every user.

An example of a flow that is executed in the present embodiment will be described below in detail. In the example, a storage operation task is an allocation of a logical volume to a host. Moreover, one user is adopted as an example in the following. The user is referred to as a "target user" in the following. The task control program 541 can identify that a user of a client 555 of the other side of a communication is a target user for the server 557. For instance, a target user can be identified by a user ID that has been input during a login of a target user. The storage management program 540 can execute the above identification by inputting a user ID from a user to a client 555 and by transmitting the user ID to the server 557.

Figure 7:
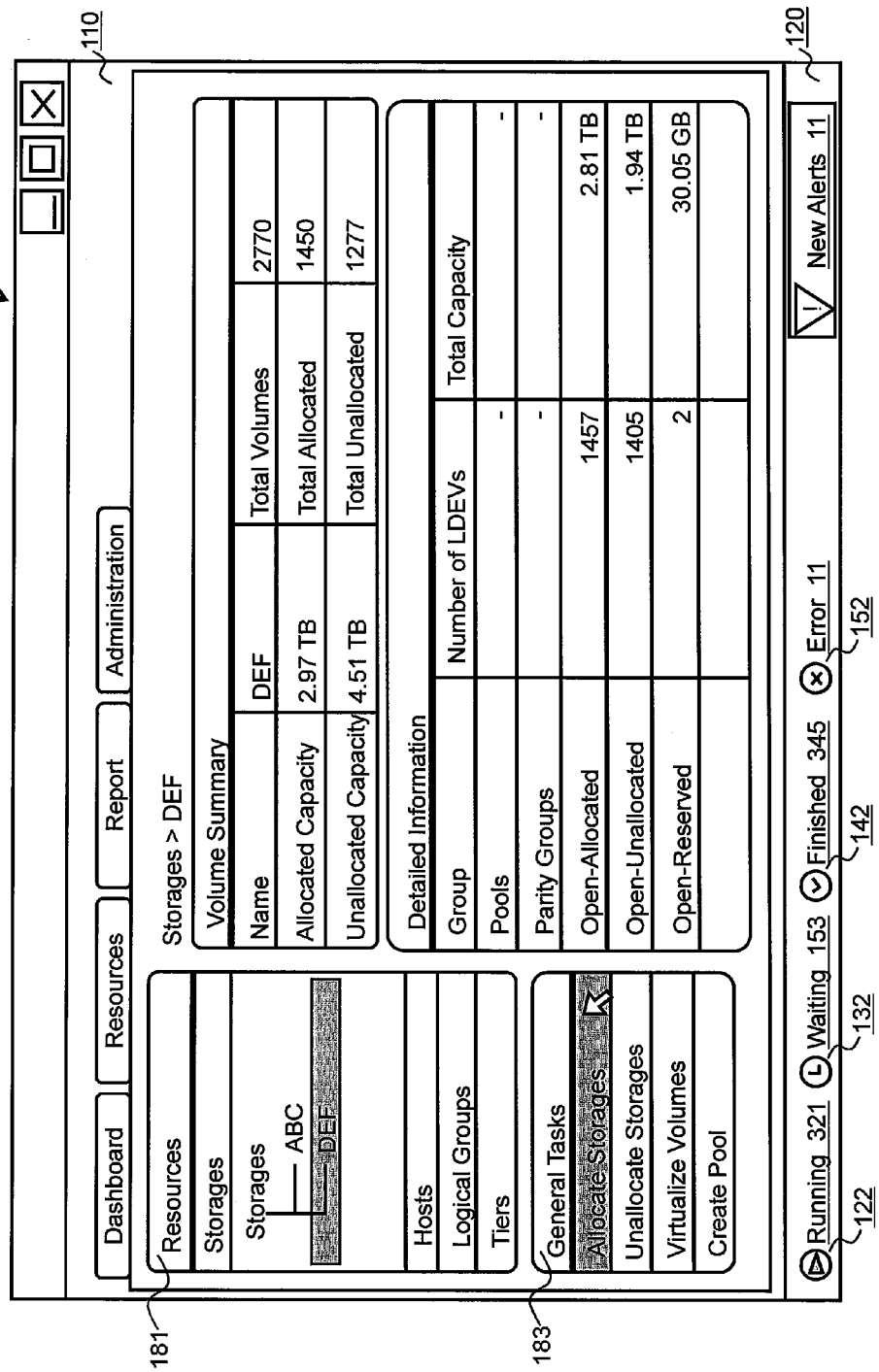
FIG. 7 shows a Web browser screen 101 at a point of time.

As shown in FIG. 7, the following processing is executed on a tab screen of a tab "Resources":
(*) a user specification of a storage ID "DEF" of a resource "Storages" is executed for a subarea 181; and
(*) a user specification of a task type "Allocate Storages" is executed for a subarea 183.

The management client program 513 detects that such a user specification has been executed via the Web browser 511.

A value that is displayed in the second area 120 of FIG. 7 is a value that is indicated by the number of statuses 612 to 615 and the number of alerts 616 that have been registered in the user table 544 for the server 557 at first. The value that is indicated by the number of statuses 612 to 615 and the number of alerts 616 is notified from the task control program 541 to the management client program 513, and is stored into the storage resource (such as a memory) 505 of the client 555. The value that has been stored is then displayed in the second area 120 by the Web browser 511. The value that is indicated by the number of statuses 612 to 615 and the number of alerts 616 is a value that indicates the number of storage operation tasks that belong to a status of "Running", a value that indicates the number of storage operation tasks that belong to a status of "Waiting", a value that indicates the number of storage operation tasks that belong to a status of "Finished", a value that indicates the number of storage operation tasks that belong to a status of "Error", and a value that indicates the number of alerts in the second area 120. Moreover for instance, "at first" means a time when a display that contains the first area 110 and the second area 120 is executed on the Web browser screen 101 for the first time.

Figure 8:
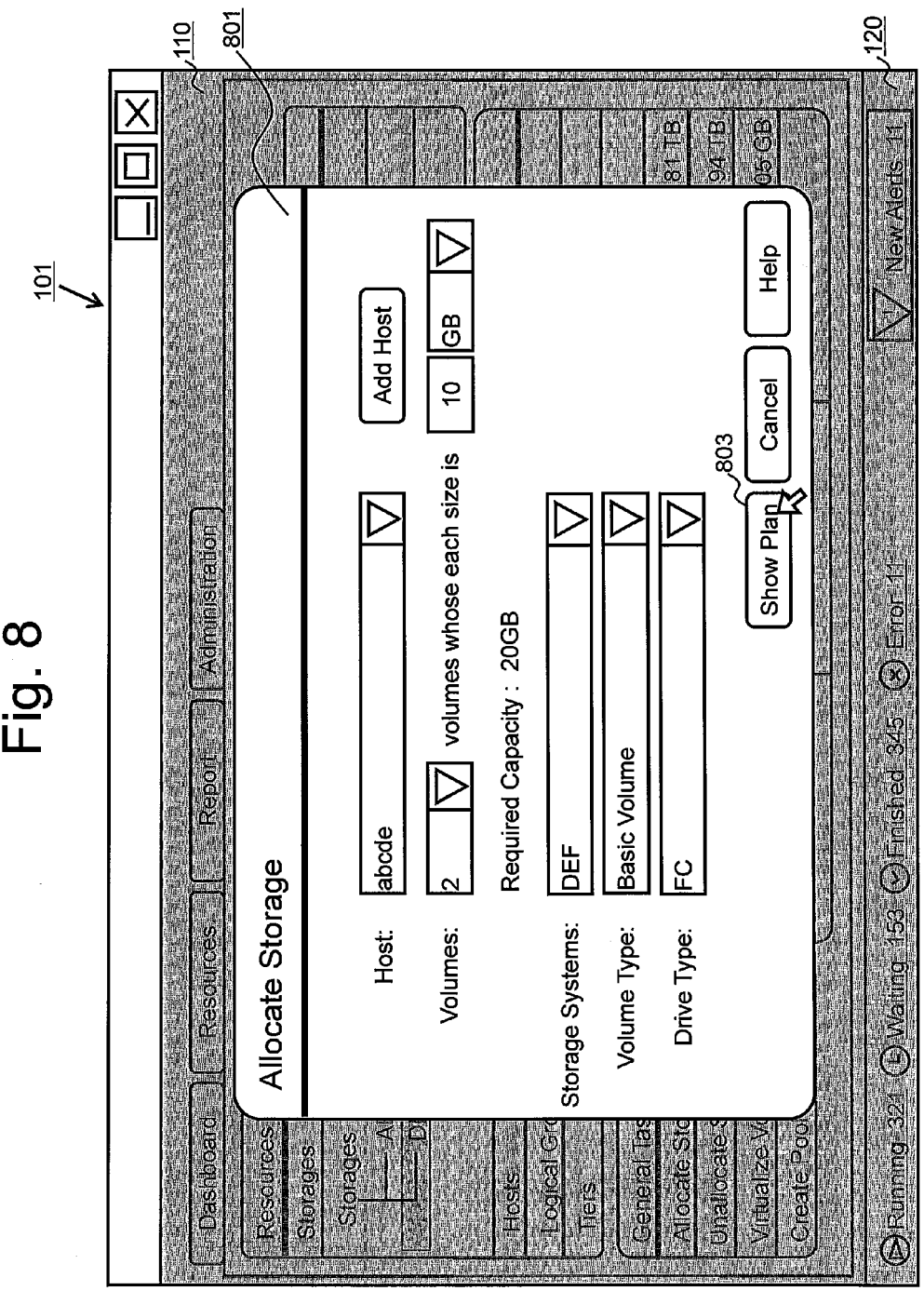
FIG. 8 shows a dialogue box 801 that is displayed on the front of the Web browser screen 101 in the case in which a specific user operation is executed to a first area 110 of the Web browser screen 101 of FIG. 7, and shows that the Web browser screen 101 is in a disable status.

In the case in which the management client program 513 detects the above described user specification to the Web browser screen 101 shown in FIG. 7, the management client program. 513 displays a dialog box 801 as shown in FIG. 8 and makes the Web browser screen 101 other than the dialog box 801 be in a disable state (a state in which a user operation to the Web browser screen 101 is disabled). The dialog box 801 has an input field (that is also an object) of the information of a type that is required for allocating a logical volume in a storage system to a host and a button 803 for executing a display of an allocation plan that conforms to the information that has been input. It can also be said that the "plan" is a proposal of the storage management program 540.

Figure 9:
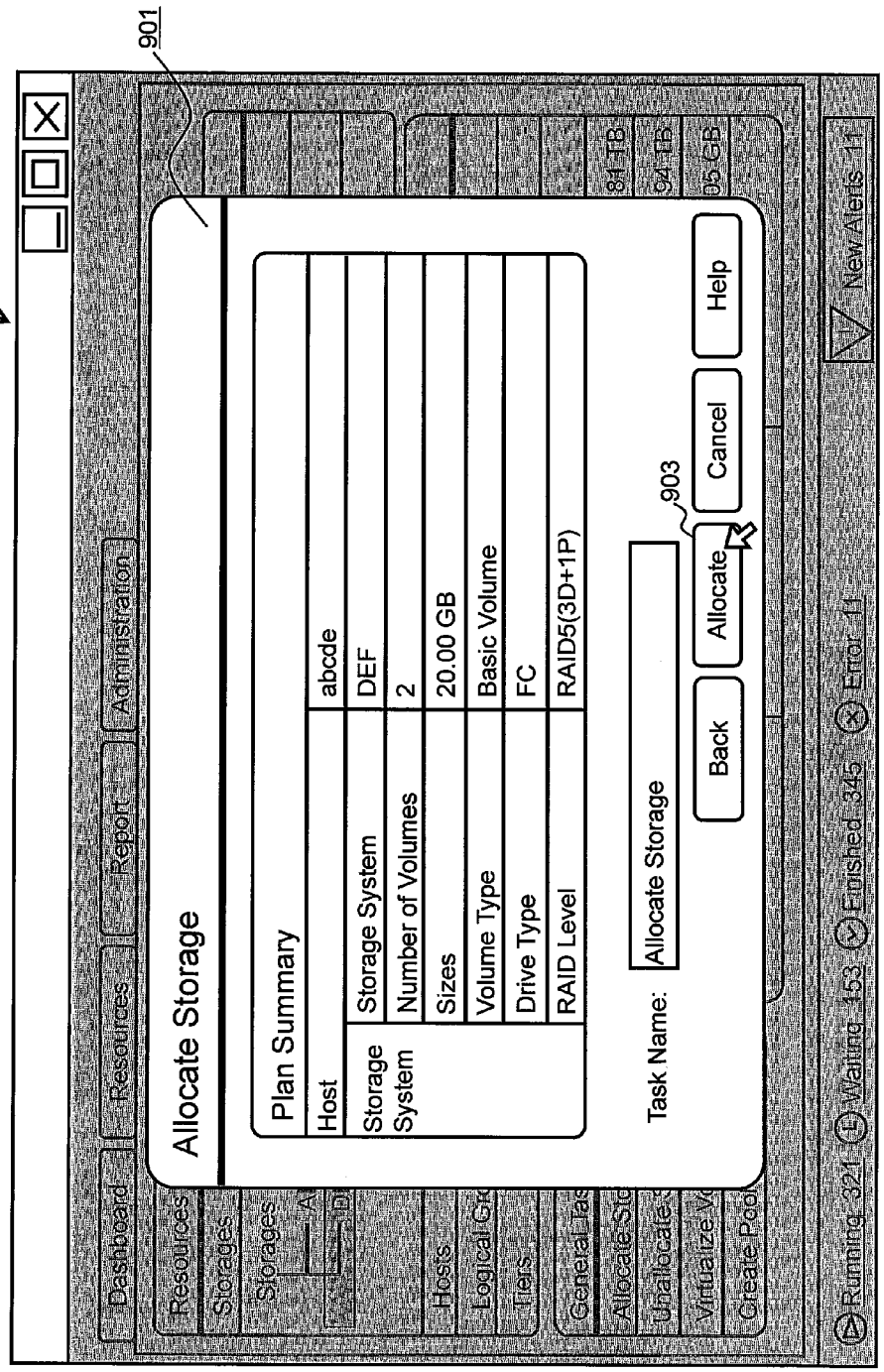
FIG. 9 shows a dialogue box 901 that is displayed on the front of the Web browser screen 101 in the case in which a specific work operation is executed in the dialogue box 801 of FIG. 8.

In the case in which the information of a wide variety of types is input to the dialog box 801 by a user operation and a user specification is executed for the button 803 (the button 803 is pressed), the management client program 513 transmits the information of a wide variety of types that have been input to the server 557. The server 557 creates an allocation plan of a logical volume based on the information of a wide variety of types and transmits the information that indicates the plan (hereafter referred to as the allocation plan information) to the client 555. The client 555 receives the allocation plan information, and the management client program 513 displays the dialog box 901 as shown in FIG. 9. Even at this point of time, a screen other than the dialog box 901 in the Web browser screen 101 is in a disable state. The dialog box 901 displays the allocation plan information that has been received by the client 555 and a button 903 for notifying that the allocation plan that conforms to the information has been agreed to.

Figure 10:
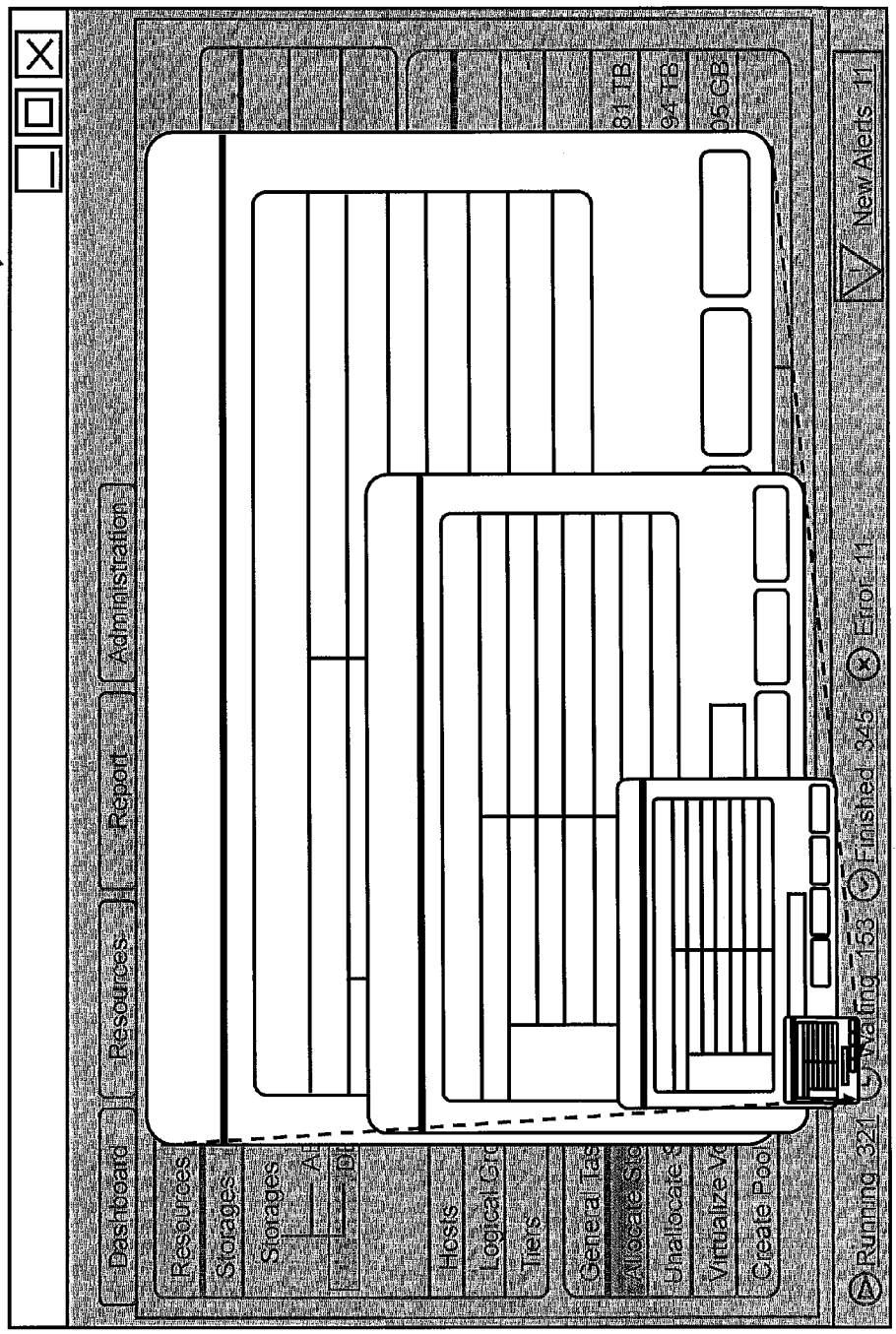
FIG. 10 shows an example of a display update that is executed in the case in which a specific work operation is executed to the dialogue box 901 of FIG. 9.
Figure 11:
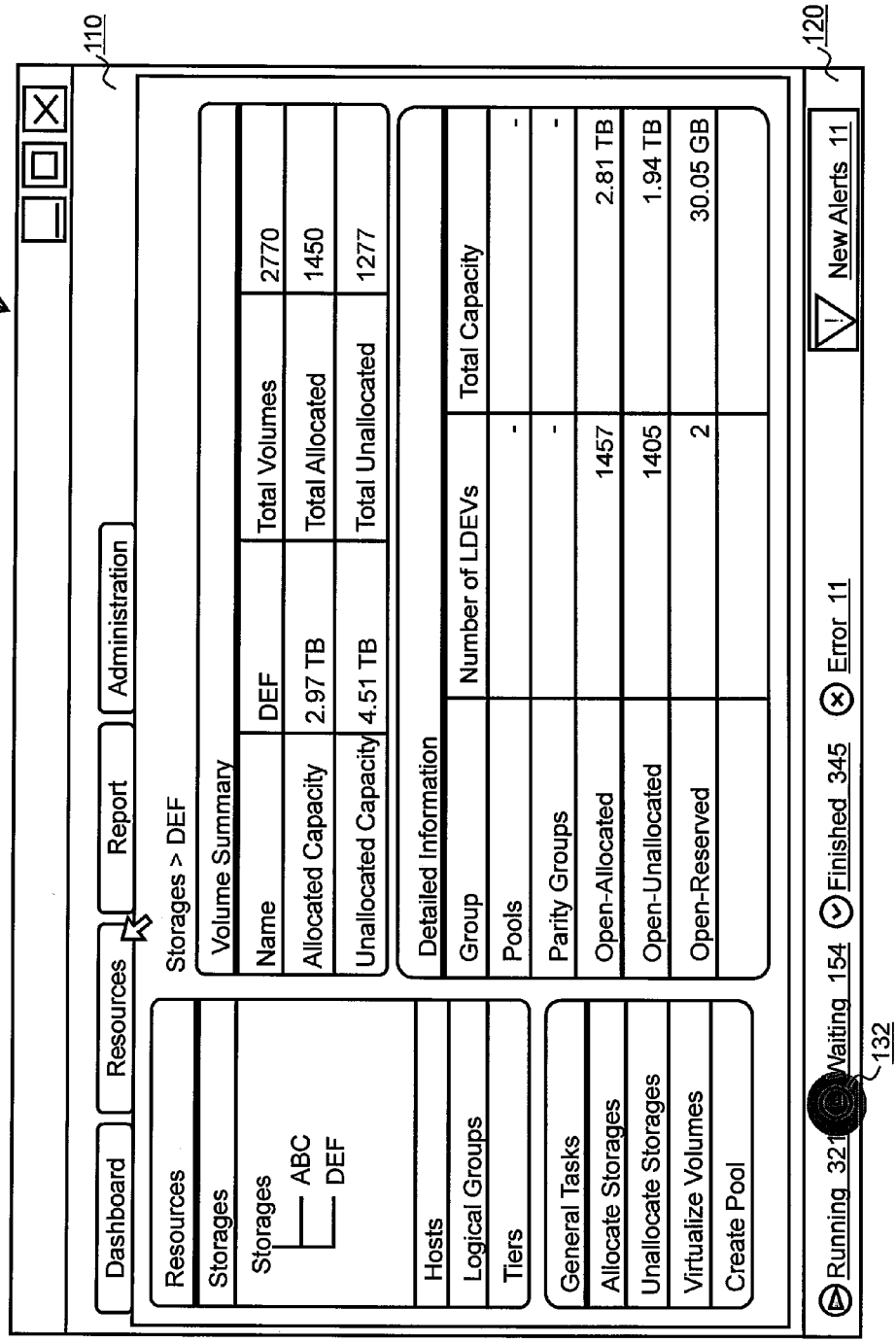
FIG. 11 shows an example of a display update for the second area 120 that is executed after the display update shown in FIG. 10.

In the case in which a user specification is executed for the button 903 (the button 903 is pressed), the management client program 513 executes the following processing:
(a1) the management client program 513 closes the dialog box 901 as shown in FIG. 10;
(a2) the management client program 513 smoothly (or a little bit at a time in small steps) reduces a display in the Web browser screen 101 to be a status object 132 (such as an icon) of a status type of "Waiting" as shown in FIG. 10;
(a3) the management client program 513 executes a weak arousal display for a status object 132 of a status of "Waiting" (more specifically, executes a highlighting of an icon for a certain period of time) as shown in FIG. 11;
(a4) the management client program 513 increases a value of the number of storage operation tasks that belong to a status of "Waiting" by 1 (and increases a value of the number of statuses of "Waiting" that has been stored into the storage resource 505 of the client 555 by 1) as shown in FIG. 11;
(a5) the management client program 513 changes a state of the Web browser screen 101 from a disable state to an enable state (a state in which a user operation to the Web browser screen 101 is valid) as shown in FIGS. 11; and
(a6) the management client program 513 transmits the information that indicates a storage operation task (hereafter referred to as the task information) that conforms to the information (for instance, a content that is displayed as a plan) that indicates an allocation plan that has been agreed to by a target user (an allocation plan that has been displayed in the dialog box 901) to the task control program 541. In the case in which the task control program 541 receives the task information from the client 555, the task control program 541 executes a registration/execution processing of a task. The task information includes a storage ID ("DEF") and the information that indicates a type of a task ("Allocate Storage"), for instance.

Since a plan that is a source of the task information is created by the storage management program 540, it is also possible that an identifier of a plan is transmitted in the above (a6) and the task control program 541 creates the task information that is received based on the identifier of a plan that has been received and the information of a plan in the above processing.

Figure 12:
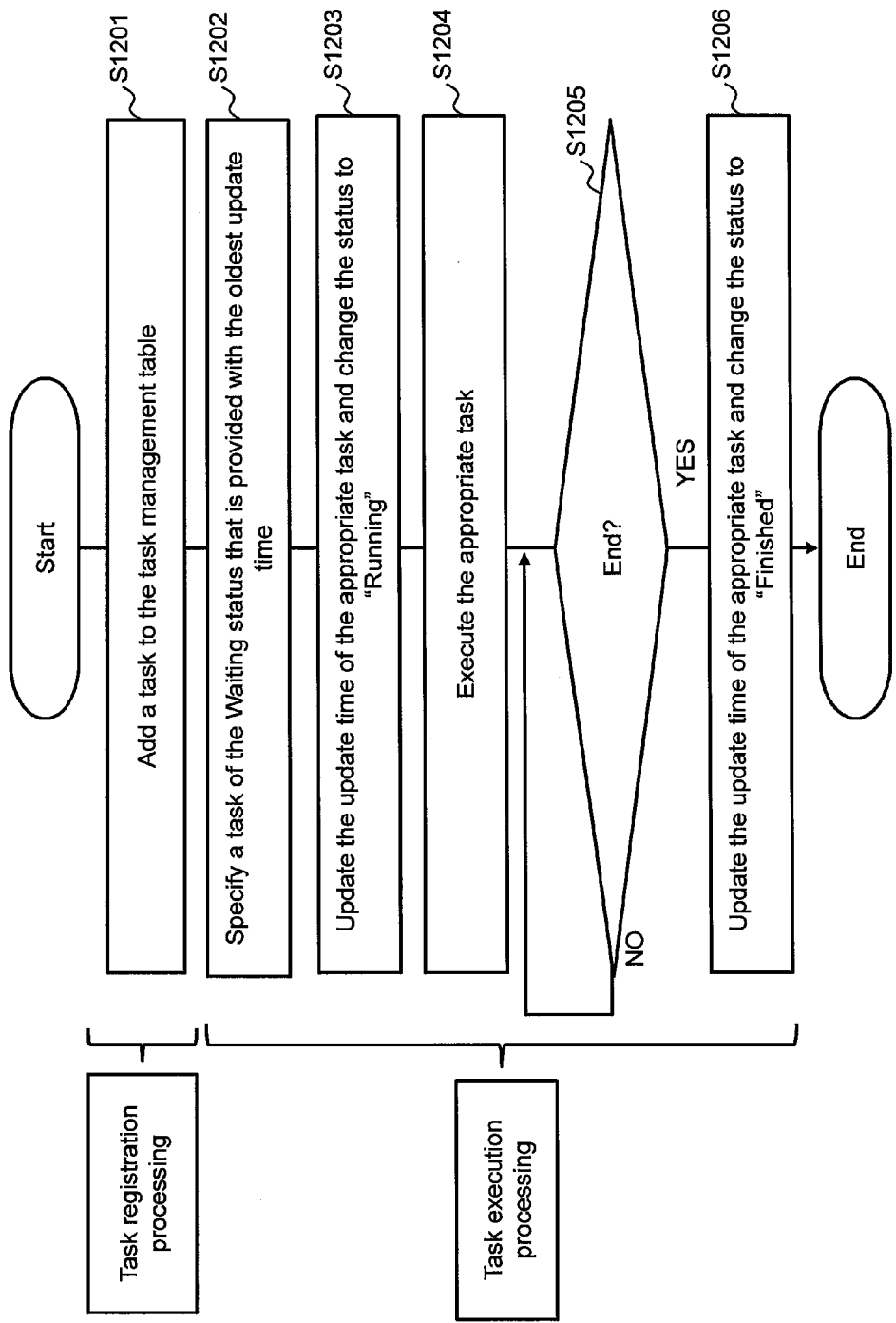
FIG. 12 shows a flow of a registration/execution processing of a task.

FIG. 12 shows a flow of a registration/execution processing of a task.

The task control program 541 executes a registration processing of a task in S1201. In other words, the task control program 541 adds the information related to a task that conforms to the task information to the task management table 543. More specifically, the task control program 541 executes the following processing, for instance:
(*) the task control program 541 decides a task ID for the storage operation task and registers the task ID that has been decided as a task ID 601;
(*) the task control program 541 registers a storage ID that is included in the task information as a storage ID 602;
(*) the task control program 541 registers the information that indicates a task type that is included in the task information as a task type 603;
(*) the task control program 541 registers "Waiting" as a status 605; and
(*) the task control program 541 registers the information that indicates a current time (the information that indicates a time at a point of time of S1201) as an update time 606.

In the next place, the task control program 541 executes an execution processing of a task (the processing that includes the processing of S1202 to S1206). As a substitute for or in addition to that the execution processing of a task is executed after the registration processing of a task (the execution processing of a task is executed taking the registration processing of a task as an opportunity), the execution processing of a task can also be executed without taking the registration processing of a task as an opportunity. For instance, the execution processing of a task can also be executed on a periodic basis.

In S1202, the task control program 541 specifies the oldest Waiting task. More specifically, the task control program 541 specifies a storage operation task in which a time that is indicated by an update time 606 is oldest of at least one storage operation task that has a status 605 of "Waiting", for instance.

In S1203, the task control program 541 modifies the status 605 to be "Running" and updates the update time 606 to be the information that indicates a time at a point of time of S1203 for the storage operation task that has been specified in S1202.

In S1204, the task control program 541 executes the storage operation task that has been specified in S1202. More specifically, the task control program 541 creates a storage management instruction that is required for executing the storage operation task, transmits the storage management instruction to the storage system 551, and receives a result of the storage management instruction as needed to execute the storage operation task.

In the case in which the storage operation task that has been executed in S1204 is terminated (S1205: Yes), the task control program 541 modifies the status 605 to be "Finished" and updates the update time 606 to be the information that indicates a time at a point of time of S1206 for the storage operation task.

Figure 13:
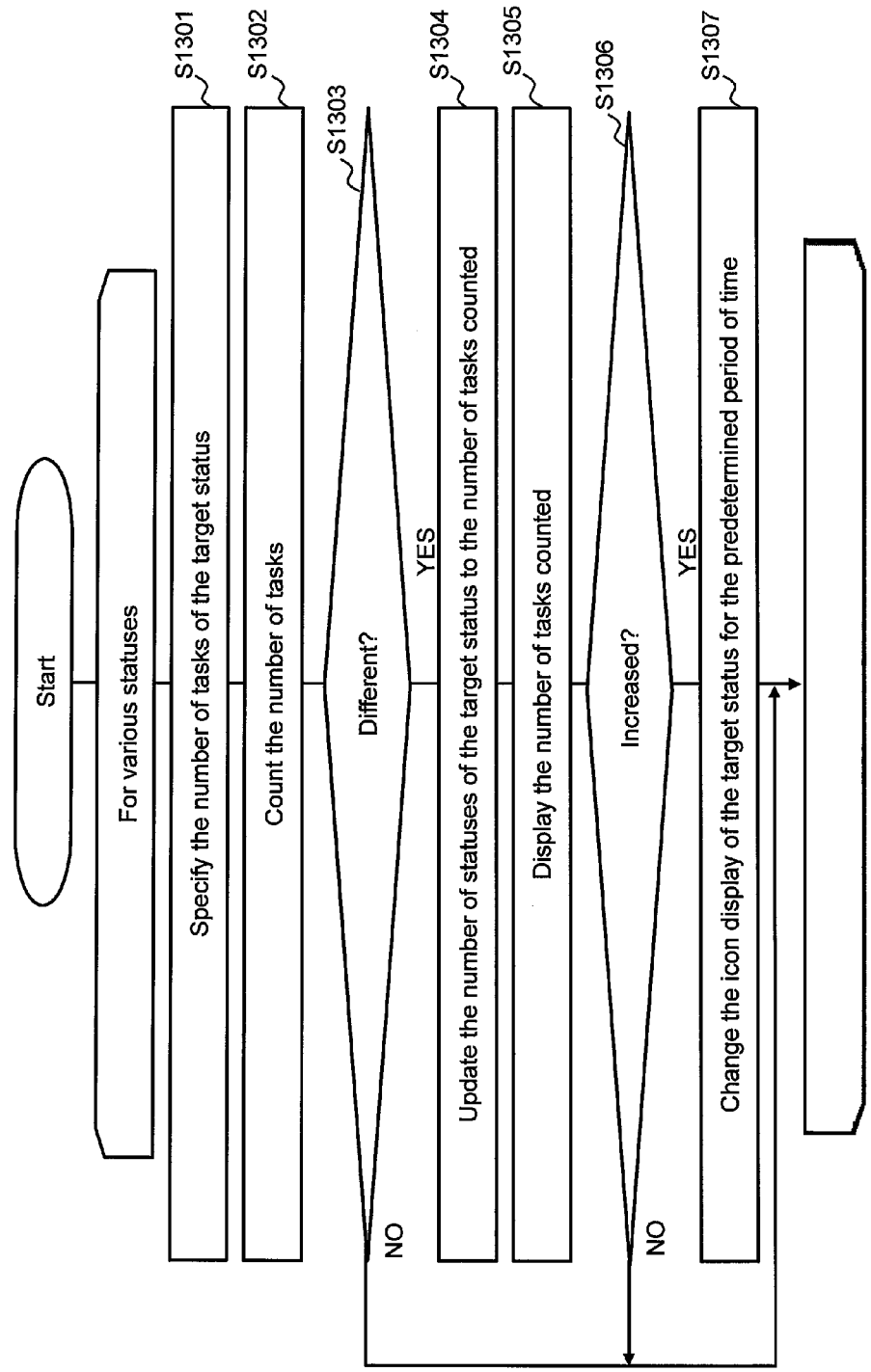
FIG. 13 shows a flow of a monitoring/display update processing of a task.

FIG. 13 shows a flow of a monitoring/display update processing of a task.

The present processing is started by the task monitoring program 542 on a periodic basis (or in a repetitive manner), for instance. The processing of S1301 and the subsequent processing are executed for each of the information 612 to 616 of the user table 544. The present processing will be described using one status as an example (referred to as a target status in the descriptions of FIG. 13).

In S1301, the task monitoring program 542 refers to the user table 544 and specifies the number of the storage operation tasks that belong to the target status (the number of statuses).

In S1302, the task monitoring program 542 refers to the task management table 543 and counts the number of the storage operation tasks that have the status 605 equivalent to the target status.

In S1303, the task monitoring program 542 judges whether or not the number that has been specified in S1301 and the number that has been counted in S1302 are different from each other. In the case in which the result of the judgment is positive, S1304 is executed. In the case in which the result of the judgment is negative, the processing is terminated for the target status and S1301 is executed for another status.

In S1304, the task monitoring program 542 updates the value that corresponds to the target status in the user table 544 to be the value that indicates the number that has been counted in S1302. Moreover, the task monitoring program 542 notifies the management client program 513 of the value that indicates the number that has been counted in S1302.

In S1305, the management client program 513 receives the value that indicates the number that has been counted in S1302 from the task monitoring program 542, and updates the value that indicates the number of the storage operation tasks that belong to the target status in the second area 120 to be the value that has been received (the value that indicates the number that has been counted in S1302).

In S1306, the management client program 513 judges whether or not the value after the update in S1305 is larger than the value before the update in S1305 in the second area 120. In other words, the management client program 513 judges whether or not the number of the storage operation tasks that belong to the target status has been increased. In the case in which the result of the judgment is positive, S1307 is executed. In the case in which the result of the judgment is negative, the processing is terminated for the target status and S1301 is executed for another status.

In S1307, the management client program 513 executes a weak arousal display for an icon that corresponds to the target status. S1307 and S1305 can also be executed at the same time.

The descriptions of the present embodiment have been executed above. The storage management software can be provided as an RIA by the present embodiment.

Moreover, in the case in which a user operation for executing a work operation for creating a storage operation task, the Web browser screen 101 becomes in the disable state and a work operation screen (such as a dialog box) that is a screen that is used in a work operation is displayed on the front of the Web browser screen 101. In the case in which a work operation is executed via a work operation screen (for instance, in the case in which the information related to a storage operation task is input), a status of the storage operation task that conforms to the work operation is managed as "Waiting". The disable state of the Web browser screen 101 is then canceled without an execution or a termination of the storage operation task. In other words, a work operation for newly creating a storage operation task can be enabled.

In the case in which a plurality of Web browsers is started and displayed and the same RIA is executed on each of a plurality of screens (more specifically, a plurality of the RIAs is executed by accessing Web pages that provide the same RIA in parallel in the Web browser screen (or in a tab screen of the Web browser screen)), a plurality of user operations are thought to be possible on the surface. However, it is not always true that an operation that has been executed by a storage operation task (process) is reflected to another storage operation task (process) in an expeditious way from the point of view of a characteristic of the RIA. As one of causes related to the reflection, the RIA is a program in which a wide area network (such as the Internet) is assumed. Even in the case in which a plurality of the RIAs that have been started is executed by the same client, each of the RIAs is frequently handled as being executed by different computers from the point of view of an RIA execution environment. As a result, even in the case in which a plurality of the RIAs is started by the same client, the above reflection cannot be executed in an orderly fashion and a storage management cannot be easily executed.

Consequently, even in the case in which the management client program is an RIA in the present embodiment, it can be said that a plurality of the information of the storage operation task can be input in parallel in essence without opening a plurality of Web browser screens (in other words, in a single Web browser screen). More specifically, in the case in which at least one storage operation task is in a wait state, it can be said that the information of the storage operation task can be newly input via a work operation screen that is displayed on the front of the Web browser screen. As a result, even in the case in which the management client program 513 is an RIA, a reduction of operability for a user can be moderated.

In accordance with the present embodiment, in the case in which a status of a storage operation task that is managed by the server 557 is modified, a value that indicates the latest number (the number after the update) of storage operation tasks that belong to the status is notified from the task monitoring program 542 to the management client program 513. The value that corresponds to the status in the second area 120 is then updated to be the value that has been notified. Consequently, a user can know the latest number of storage operation tasks that is accompanied with a modification of a status of the storage operation task in an expeditious way.

While the preferred embodiment in accordance with the present invention has been described above, the present invention is not restricted to the embodiment, and various changes, modifications, and functional additions can be thus made without departing from the scope of the present invention as a matter of course.

Figure 14:
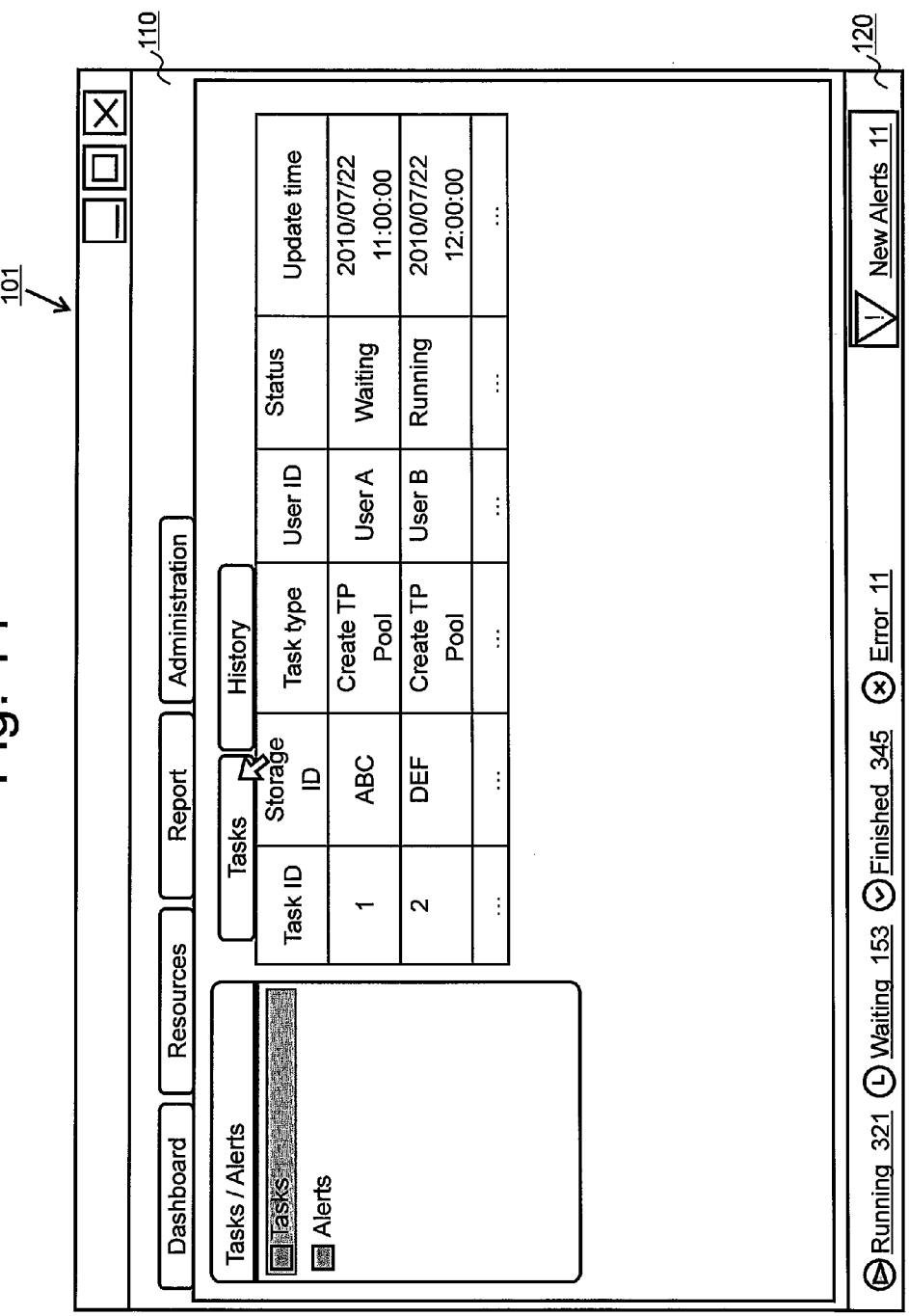
FIG. 14 shows an example of the Web browser screen that includes the first area that displays a list (a first list) of the information related to a storage operation task for a plurality of users.
Figure 15:
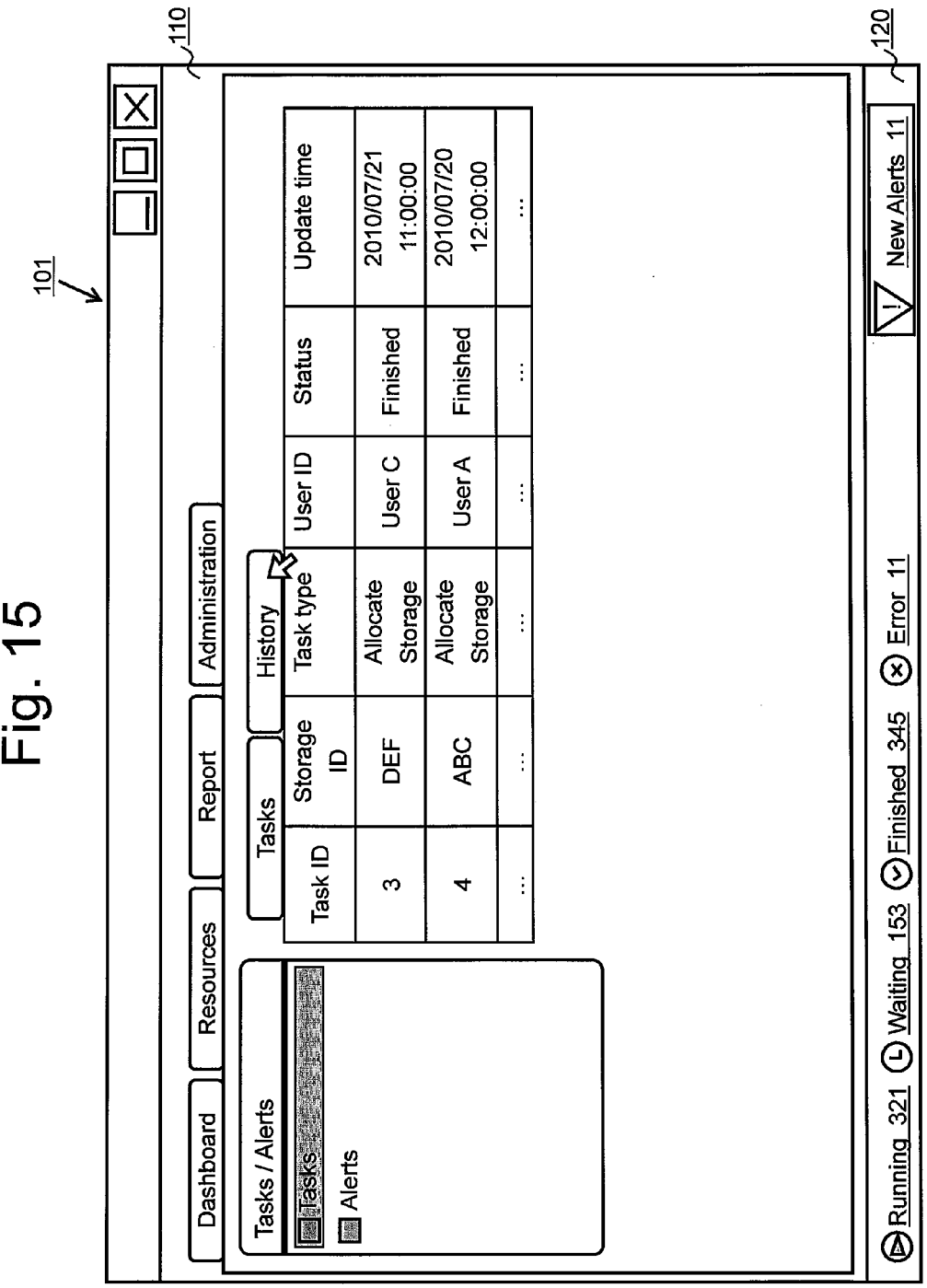
FIG. 15 shows an example of the Web browser screen that includes the first area that displays a list (a second list) of the information related to a storage operation task for a plurality of users.

For instance, for the display device 502 of the client 555, it can also be possible that the display on the first area 110 is a display for a plurality of users (for instance, all users) and the display on the second area 120 is a display for a user of the client 555. The display for a plurality of users can also be a list of the information related to a storage operation task that belongs to Waiting, Running, and Error (hereafter referred to as a first list) as shown in FIG. 14, or the display for a plurality of user can also be a list of the information related to a storage operation task that belongs to Finished (hereafter referred to as a second list) as shown in FIG. 15. The first list and the second list can also include the information that is included in the task management table 543, can also be transmitted from the task control program 557 to the management client program 513, and can also be displayed on the first area 110 by the management client program 513. This is because an ingenuity on a display of the second area 120 targets a task of a target user whereby a highlighting is avoided, and on the other hand, a situation of a task that has been created by another user must be confirmed as needed in some case (for instance, in the case of a user of an upper level of each user).

Moreover for instance, the processing that has been described with reference to FIG. 10 and FIG. 11 can also be executed after the task control program 541 executes a task registration processing. More specifically, the following flow can also be executed:

(*) the management client program 513 transmits the information related to that an allocation plan has been agreed to by a user to the task control program 541;

(*) the task control program 541 receives the information, executes the task registration processing, and transmits the information related to the number of storage operation tasks that belong to a status of "Waiting" (for instance, that the number has been increased by 1, or the number after the modification) to the management client program 513; and (*) the management client program. 513 receives the information and executes the processing that has been described with reference to FIG. 10 and FIG. 11.

Moreover, the processing of a wide variety of types that has been described in the present embodiment can also be executed by the storage management program 540 or the management client program 513. However, it is preferable that the server 557 is in charge of the processing for obtaining the information from the storage system and the processing for transmitting a management instruction that is to be configured for the storage system. This is because since the client 555 can be a computer that is coupled to the communication network 521 even on a temporary basis, an installation of a processing for obtaining the information in a repetitive manner from the storage system is unsuitable (or the installation is hard to be executed). Moreover, it is convenient from a point of view of security that a management instruction that may cause an elimination of data or a stoppage of a storage system is transmitted from the server 557 that has been determined.

REFERENCE SIGNS LIST

101: Web browser screen
511: Web browser
513: Management client program
541: Task control program
542: Task monitoring program
543: Task management table
544: User table

The invention claimed is:

1. A display method implemented by a management system managing a computer system, comprising:
   (a) displaying a management screen including:
      (a1) a first area including computer system information related to the computer system, and including an input object for registering management tasks, which correspond to specified processings that the computer system is instructed to perform, into the management system or an object for displaying the input object for registering the management tasks, which correspond to specified processings that the computer system is instructed to perform; and
      (a2) a second area which is separate from and smaller than the first area, and which is displayed without being affected by an operation of the first area, and which includes:
         a number of management tasks of which a task status is a waiting status, and an object indicating the waiting status, wherein all management tasks having the waiting status are management tasks for which execution has not yet commenced;
         a number of the management tasks of which the task status is a running status, and an object indicating the running status; and
         a number of the management tasks of which the task status is a finished status, and an object indicating the finished status,
   (b) in accordance with a user operation to the input object, registering a new management task of which the task status is the waiting status, incrementing the number of the management tasks of which the task status is the waiting status, accepting a new user operation to the first area before finishing the new management task, identifying a management task of the management tasks of which the task status is the waiting status that has the oldest update time, changing the task status of the identified management task having the oldest update time to the running status, and executing the identified management task having the oldest update time, and
   (c) detecting a management task of which the task status is changed from one of the waiting status, the running status, and the finished status to another one of the waiting status, the running status, and the finished status; and
   (d) according to (c), changing the number of the management tasks that corresponds to the task status to which the task status is changed;
   wherein a Web browser and a management client program is executed by the management system so that the displaying of (a) is performed, the management client program is a Rich Internet Application (RIA),
   wherein the method further comprises:
   (e) displaying a second input object on a front of the first area in accordance with the user operation to the input object before the registration of management task in (b), and causing the management screen to be in a disable status;
   (f) receiving input information according to the second input object, for the registration of the management task in (b); and
   (g) closing the second input object and canceling the disabled status of the management screen,
   wherein said registration of the new management task in (b) is performed further in accordance with the input information according to the second input object,
   wherein during the closing of the second input object in (g), the second input object is moved toward the object indicating the wait status, with a size of the second input object being reduced smoothly, and
   wherein the management tasks are storage operation tasks for a storage system included in the computer system, where the storage operation tasks include at least one of: (1) creating a logical volume; (2) allocating a logical volume that has been created to a host; (3) associating a pool storage area to a virtual volume; and (4) associating a real volume with a virtual volume.

2. A display method according to claim 1,
   wherein (d) is processed with:
      (d1) highlighting the number of the management tasks that corresponds to the task status to which the task status is changed, or the object indicating the task status to which the task status is changed, in part or all; and
      (d2) canceling the highlighting in case that a certain period of time being elapsed from the highlighting even if there are no specific user operations to the management screen after the highlighting.

3. A display method according to claim 1,
   wherein the second area includes an object indicating an alert indicating a hardware failure of the computer system occurred, and wherein the method further comprises:
(h) in case that a new alert is detected, highlighting the object indicating the alert until an user operation to the object indicating the alert is performed.

4. A display method according to claim 1,
wherein the management system identifies a user using the management screen,
wherein the first area displays management task information about the registered management task registered by the user and other user, and
wherein the registered management task to be referred by (b), (c), and (d) is not registered by the user.

5. A display method according to claim 1,
wherein the second area further includes a number of the management tasks of which the task status is an error status, and an object indicating the error status.

6. A display method according to claim 1,
wherein the first area further includes a sub area including the computer system information, and tabs, and
wherein the computer system update the sub area according to a selection of the tabs.

7. A non-transitory computer readable medium for a management system managing a computer system, storing a computer program causing the management system to:
(a) display a management screen including:
  (a1) a first area including computer system information related to the computer system, and including an input object for registering management tasks, which correspond to specified processings that the computer system is instructed to perform, into the management system or an object for displaying the input object for registering management tasks, which correspond to specified processings that the computer system is instructed to perform; and
  (a2) a second area which is separate from and smaller than the first area, and which is displayed without being affected by an operation of the first area, and which includes:
    a number of the management tasks of which a task status is a waiting status, and an object indicating the waiting status, wherein all management tasks having the waiting status are management tasks for which execution has not yet commenced;
    a number of the management tasks of which the task status is a running status, and an object indicating the running status; and
    a number of the management tasks of which the task status is a finished status, and an object indicating the finished status,
(b) in accordance with a user operation to the input object, register a new management task of which the task status is the waiting status, incrementing the number of the management tasks of which the task status is the waiting status, accepting a new user operation to the first area before finishing the new management task, identifying a management task of the management tasks of which the task status is the waiting status that has the oldest update time, changing the task status of the identified management task having the oldest update time to the running status, and executing the identified management task having the oldest update time, and
(c) detect a management task of which the task status is changed from one of the waiting status, the running status, and the finished status to another one of the waiting status, the running status, and the finished status; and
(d) according to (c), change the number of the management tasks that corresponds to the task status to which the task status is changed;
wherein a Web browser and a management client program is executed by the management system so that the displaying of (a) is performed, the management client program is a Rich Internet Application (RIA),
wherein the computer program further causing the management system to:
(e) display a second input object on a front of the first area in accordance with the user operation to the input object before the registration of management task in (b), and cause the management screen to be in a disable status;
(f) receive input information according to the second input object, for the registration of the management task in (b); and
(g) close the second input object and canceling the disabled status of the management screen,
wherein said registration of the new management task in (b) is performed further in accordance with the input information according to the second input object,
wherein during the closing of the second input object in (g), the second input object is moved toward the object indicating the wait status, with a size of the second input object being reduced smoothly, and
wherein the management tasks are storage operation tasks for a storage system included in the computer system, where the storage operation tasks include at least one of: (1) creating a logical volume; (2) allocating a logical volume that has been created to a host; (3) associating a pool storage area to a virtual volume; and (4) associating a real volume with a virtual volume.

8. The non-transitory computer readable medium for a management system managing a computer system, storing a computer program according to claim 7,
wherein (d) is processed with:
  (d1) highlighting the number of the management tasks that corresponds to the task status to which the task status is changed, or the object indicating the task status to which the task status is changed, in part or all; and
  (d2) canceling the highlighting in case that a certain period of time being elapsed from the highlighting even if there are no specific user operations to the management screen after the highlighting.

9. The non-transitory computer readable medium for a management system managing a computer system, storing a computer program according to claim 7,
wherein the second area includes an object indicating an alert indicating a hardware failure of the computer system occurred, and
wherein the computer program further causes the management system to:
(h) in case that a new alert is detected, highlight the object indicating the alert until an user operation to the object indicating the alert is performed.

10. The non-transitory computer readable medium for a management system managing a computer system, storing a computer program according to claim 7,
wherein the management system identifies a user using the management screen,
wherein the first area displays management task information about the registered management task registered by the user and other user, and
wherein the registered management task to be referred by (b), (c), and (d) is not registered by the user.

11. The non-transitory computer readable medium for a management system managing a computer system, storing a computer program according to claim 7,
wherein the second area further includes a number of the management tasks of which the task status is an error status, and an object indicating the error status.

12. The non-transitory computer readable medium for a management system managing a computer system, storing a computer program according to claim 7,
wherein the first area further includes a sub area including the computer system information, and tabs, and
wherein the computer system update the sub area according to a selection of the tabs.

13. A management system for managing a computer system, comprising:
at least one processor; and
at least one storage resource storing a computer program causing the processor to:
(a) display a management screen including:
(a1) a first area including computer system information related to the computer system, and including an input object for registering management tasks, which correspond to specified processings that the computer system is instructed to perform, into the management system or an object for displaying the input object for registering management tasks, which correspond to specified processings that the computer system is instructed to perform; and
(a2) a second area which is separate from and smaller than the first area, which is displayed without being affected by an operation of the first area, and which includes:
a number of the management tasks of which a task status is a waiting status, and an object indicating the waiting status, wherein all management tasks having the waiting status are management tasks for which execution has not yet commenced;
a number of the management tasks of which the task status is a running status, and an object indicating the running status; and
a number of the management tasks of which the task status is a finished status, and an object indicating the finished status,
(b) in accordance with a user operation to the input object, register a new management task of which the task status is the waiting status, incrementing the number of the management tasks of which the task status is the waiting status, accepting a new user operation to the first area before finishing the new management task, identifying a management task of the management tasks of which the task status is the waiting status that has the oldest update time, changing the task status of the identified management task having the oldest update time to the running status, and executing the identified management task having the oldest update time, and
(c) detect a management task of which the task status is changed from one of the waiting status, the running status, and the finished status to another one of the waiting status, the running status, and the finished status; and
(d) according to (c), change the number of the management tasks that corresponds to the task status to which he task status is changed;
wherein a Web browser and a management client program is executed by the management system so that the displaying of (a) is performed, the management client program is a Rich Internet Application (RIA),
wherein the computer program further causing the processor to:
(e) display a second input object on a front of the first area in accordance with the user operation to the input object before the registration of management task in (b), and causing the management screen to be in a disable status;
(f) receive input information according to the second input object, for the registration of the management task in (b); and
(g) close the second input object and canceling the disabled status of the management screen,
wherein said registration of the new management task in (b) is performed further in accordance with the input information according to the second input object,
wherein during the closing of the second input object in (g), the second input object is moved toward the object indicating the wait status, with a size of the second input object being reduced smoothly, and
wherein the management tasks are storage operation tasks for a storage system included in the computer system, where the storage operation tasks include at least one of: (1) creating a logical volume; (2) allocating a logical volume that has been created to a host; (3) associating a pool storage area to a virtual volume; and (4) associating a real volume with a virtual volume.

14. The management system for managing a computer system according to claim 13,
wherein (d) is processed with:
(d1) highlighting the number of the management tasks that corresponds to the task status to which the task status is changed, or the object indicating the task status to which the task status is changed, in part or all; and
(d2) canceling the highlighting in case that a certain period of time being elapsed from the highlighting even if there are no specific user operations to the management screen after the highlighting.

15. The management system for managing a computer system according to claim 13,
wherein the second area includes an object indicating an alert indicating a hardware failure of the computer system occurred, and
wherein the computer program further causes the processor to:
(h) in case that a new alert is detected, highlight the object indicating the alert until an user operation to the object indicating the alert is performed.

16. The management system for managing a computer system according to claim 13,
wherein the management system identifies a user using the management screen,
wherein the first area displays management task information about the registered management task registered by the user and other user, and
wherein the registered management task to be referred by (b), (c), and (d) is not registered by the user.

17. The management system for managing a computer system according to claim 13,
wherein the second area further includes a number of the management tasks of which the task status is an error status, and an object indicating the error status.

18. The management system for managing a computer system according to claim 13,
wherein the first area further includes a sub area including the computer system information, and tabs, and wherein the computer system update the sub area according to a selection of the tabs.

* * * * *